United States Patent
Ninan et al.

(10) Patent No.: US 11,290,699 B2
(45) Date of Patent: Mar. 29, 2022

(54) VIEW DIRECTION BASED MULTILEVEL LOW BANDWIDTH TECHNIQUES TO SUPPORT INDIVIDUAL USER EXPERIENCES OF OMNIDIRECTIONAL VIDEO

(71) Applicant: Dolby Laboratories Licensing Corporation, San Francisco, CA (US)

(72) Inventors: Ajit Ninan, San Jose, CA (US); Chaitanya Atluru, San Jose, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 228 days.

(21) Appl. No.: 15/842,703

(22) Filed: Dec. 14, 2017

(65) Prior Publication Data
US 2018/0176535 A1 Jun. 21, 2018

Related U.S. Application Data
(60) Provisional application No. 62/435,997, filed on Dec. 19, 2016.

(30) Foreign Application Priority Data
Dec. 19, 2016 (EP) .................................. 16205054

(51) Int. Cl.
*H04N 13/00* (2018.01)
*H04N 13/117* (2018.01)
(Continued)

(52) U.S. Cl.
CPC ........... *H04N 13/117* (2018.05); *G06F 3/013* (2013.01); *H04N 13/15* (2018.05); *H04N 21/234345* (2013.01); *H04N 21/234363* (2013.01); *H04N 21/42201* (2013.01); *H04N 21/44218* (2013.01); *H04N 21/6587* (2013.01); *H04L 65/60* (2013.01)

(58) Field of Classification Search
CPC ......... H04N 13/117; H04N 21/234363; H04N 21/6587
See application file for complete search history.

(56) References Cited

U.S. PATENT DOCUMENTS

2002/0049979 A1* 4/2002 White ................. G11B 27/034
  725/87
2004/0086186 A1* 5/2004 Kyusojin ........... H04N 5/23238
  382/232

(Continued)

FOREIGN PATENT DOCUMENTS

EP 3065406 9/2016
WO 2005/011284 2/2005
(Continued)

*Primary Examiner* — Zhubing Ren

(57) ABSTRACT

View direction data of the viewer is collected in real time while the viewer is viewing a first reconstructed omnidirectional image. The view direction data is sent to the video streaming server to cause generating image layers from an omnidirectional image in reference to a view direction of the viewer. The image layers comprising a focal-vision image layer and a peripheral-vision image layer. A second reconstructed omnidirectional image is generated from the image layers. The second reconstructed omnidirectional image is subsequently rendered to the viewer.

20 Claims, 11 Drawing Sheets

(51) Int. Cl.
  *H04N 13/15*      (2018.01)
  *H04N 21/2343*    (2011.01)
  *H04N 21/6587*    (2011.01)
  *G06F 3/01*       (2006.01)
  *H04N 21/422*     (2011.01)
  *H04N 21/442*     (2011.01)
  H04L 65/60        (2022.01)

(56) References Cited

U.S. PATENT DOCUMENTS

| | | |
|---|---|---|
| 2004/0227703 A1 | 11/2004 | Lamvik |
| 2010/0056274 A1 | 3/2010 | Uusitalo |
| 2014/0085412 A1* | 3/2014 | Hayashi .................. G06T 11/60 348/37 |
| 2016/0133055 A1 | 5/2016 | Fateh |
| 2016/0240013 A1 | 8/2016 | Spitzer |
| 2016/0267715 A1 | 9/2016 | Patel |
| 2016/0267716 A1 | 9/2016 | Patel |
| 2016/0267884 A1 | 9/2016 | Binstock |
| 2016/0328884 A1 | 11/2016 | Schowengerdt |
| 2018/0007422 A1* | 1/2018 | Castleman ............ H04L 65/604 |
| 2018/0081178 A1 | 3/2018 | Shpunt |
| 2018/0136720 A1* | 5/2018 | Spitzer ...................... G06T 1/20 |
| 2019/0174150 A1* | 6/2019 | D'Acunto ............ H04N 19/167 |

FOREIGN PATENT DOCUMENTS

| | | |
|---|---|---|
| WO | 2012/078207 | 6/2012 |
| WO | 2014/158291 | 10/2014 |
| WO | 2016/139532 | 9/2016 |

\* cited by examiner

VIEW DIRECTION BASED MULTILEVEL LOW BANDWIDTH TECHNIQUES TO SUPPORT INDIVIDUAL USER EXPERIENCES OF OMNIDIRECTIONAL VIDEO

CROSS-REFERENCE TO RELATED APPLICATIONS

This application claims the benefit of priority from U.S. Provisional Patent application No. 62/435,997 filed Dec. 19, 2016 and European Patent Application No. 16205054.6 filed Dec. 19, 2016, which are hereby incorporated by reference in their entirety.

TECHNOLOGY

The present invention relates generally to image coding and rendering, and in particular, to view direction based multilevel low bandwidth techniques to support individual user experiences of omnidirectional video with high visual acuity.

BACKGROUND

For omnidirectional video applications, the amount of desired video data may be equivalent to eighteen 4K resolution views in order to have a seamless experience in viewing 360 video at a spatial resolution at the highest visual acuity in all potential viewing angles at all time. This amount of desired video data is enormous and is currently impractical to support by a wide variety of display devices in current network infrastructures, given the amount of bandwidth and computing power required to compress and decompress the video data.

In addition, because of large amounts of video data and video processing involved in omnidirectional video applications, significant time lags (e.g., longer than 12-15 milliseconds, etc.) may occur between a first time when a user directs the user's field of view (FOV) and a second later time when high quality image content rendered in the user's FOV, and may be readily perceivable by the user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
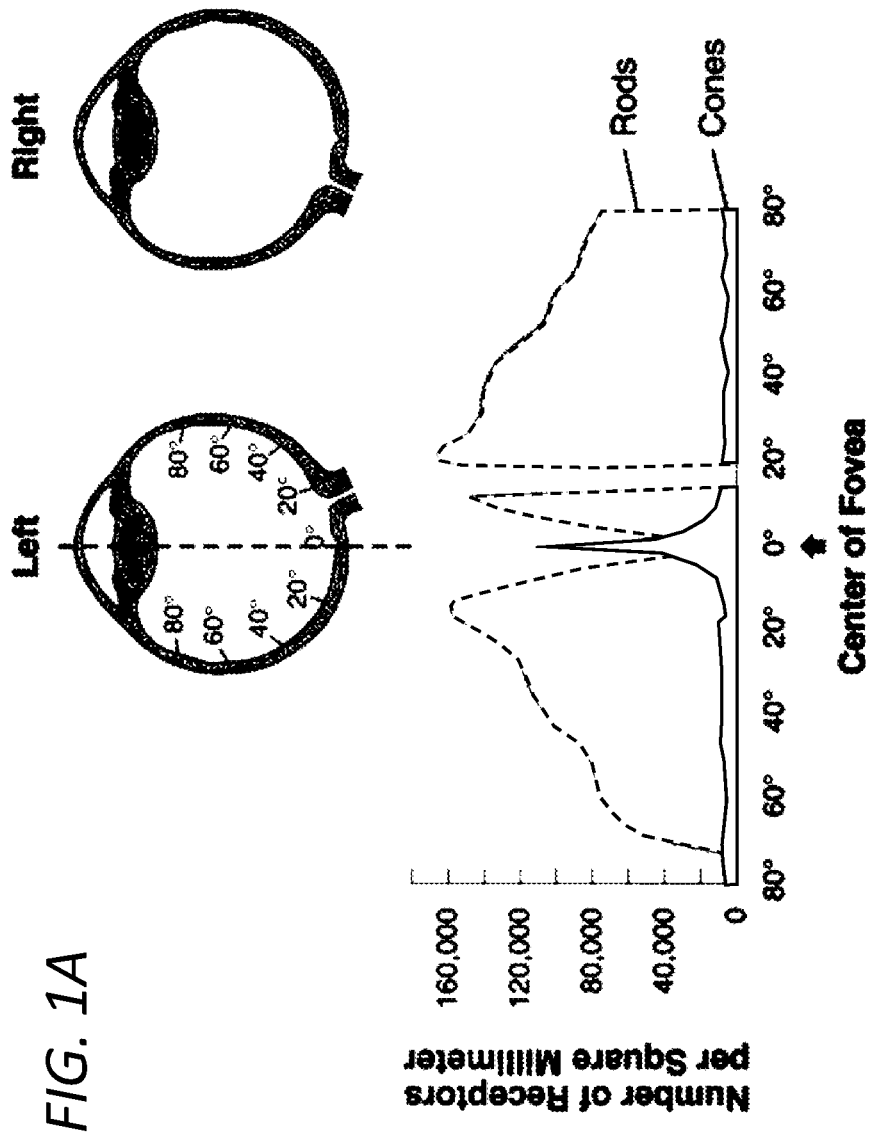
FIG. 1A illustrates example of distributions of photoreceptors present in the human eye.

Example embodiments, which relate to view direction based multilevel low bandwidth techniques to support individual user experiences of omnidirectional video, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. GENERAL OVERVIEW
2. THE HUMAN VISION FIELD
3. OMNIDIRECTIONAL VIDEO USER EXPERIENCE BASED ON VIEW DIRECTION TRACKING
4. LAYERED REPRESENTATION FOR OMNIDIRECTIONAL IMAGES
5. VIEW DIRECTION MOVEMENTS
6. BASELINE AND REFINEMENT STREAMING LAYERS
7. EXAMPLE VIDEO STREAMING SERVERS AND CLIENTS
8. EXAMPLE PROCESS FLOWS
9. IMPLEMENTATION MECHANISMS—HARDWARE OVERVIEW
10. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to minimize bandwidth usage for streaming omnidirectional video data between video streaming server(s) and video streaming client(s). Example omnidirectional video content may include, but are not necessarily limited to, any of: audiovisual programs, movies, video programs, TV broadcasts, computer games, augmented reality (AR) content, virtual reality (VR) content, automobile entertainment content, etc. Example video streaming clients may include, but are not necessarily limited to, any of: display devices, a computing device with a near-eye display, a head-mounted display (HMD), a mobile device, a wearable display device, a set-top box with a display such as television, a video monitor, etc.

As used herein, a "video streaming server" may refer to one or more upstream devices that prepare and stream omnidirectional video content to one or more video streaming clients in order to render at least a portion (e.g., corresponding to a user's FOV or viewport, etc.) of the omnidirectional video content on one or more displays. The displays on which the omnidirectional video content is rendered may be part of the one or more video streaming clients, or may be operating in conjunction with the one or more video streaming clients.

Example video streaming servers may include, but are not necessarily limited to, any of: cloud-based video streaming servers located remotely from video streaming client(s), local video streaming servers connected with video streaming client(s) over local wired or wireless networks, VR devices, AR devices, automobile entertainment devices, digital media devices, digital media receivers, set-top boxes, gaming machines (e.g., an Xbox), general purpose personal computers, tablets, dedicated digital media receivers such as the Apple TV or the Roku box, etc.

Techniques as described herein can be used to support an individual-viewer-experience view direction based omnidirectional video application with the highest visual acuity (e.g., supported by source omnidirectional video, etc.). As used herein, an omnidirectional video application may refer to any of: video display applications, VR applications, AR applications, automobile entertainment applications, remote presence applications, display applications, etc. The term "high visual acuity" or "the highest acuity" may refer to a pixel density that has little or no perceptible pixilation effect. The techniques as described herein provides omnidirectional video content with spatially varying resolutions that can be transmitted with low bandwidths while creating perceptions of high spatial resolution wherever a viewer directs view directions. The viewer's view directions can be tracked by any combination of view direction tracking methods including but not limited to gaze tracking, viewport tracking, FOV tracking, viewer position tracking, face tracking, or any other view direction tracking methods.

View direction data is collected from a single viewer (or user). Example view direction data may include, without limitation, linear displacements, angular displacements, linear motions or translations, angular motions or rotations, pitch, roll, yaw, sway, heave, surge, up to six degrees of freedom, etc., that may be collected by any combination of gaze tracking devices, position tracking devices, viewport tracking devices, face tracking devices, FOV tracking devices, etc. The viewer's view directions at a plurality of time points may be determined. The viewer's view directions can be (e.g., additionally, optionally, alternatively, etc.) used on the recipient device itself to generate new views until the upstream devices respond with new data. The viewer's view directions can also be fed back to upstream devices to generate, from omnidirectional images, specific image layers in reference to the viewer's view directions with different image related properties such as spatial resolutions, frame rates, dynamic ranges, color gamuts, etc. Instead of sending the omnidirectional images with large data volumes, the specific image layers generated in reference to the viewer's view directions, which amount to much less data volumes than the large data volumes of the omnidirectional images, are sent to the viewer's display device for rendering. In some embodiments, only a very tiny region in the viewer's vision field is given image data of the highest quality while image data in other regions of the viewer's vision field can be greatly compressed and/or downsampled.

Single-viewer-experience view direction based omnidirectional video application as described herein can be extended to support multiple viewers (or users). For example, view directions of each of the multiple viewers may be respectively tracked and/or determined. Specific image layers may be generated in reference to each viewer's own view directions to represent omnidirectional images that are to be rendered to the viewer. In some embodiments, view directions of a selected viewer, who may or may not be one in a group of one or more viewers, may be tracked and/or determined. Specific image layers may be generated in reference to the selected viewer's view directions to represent omnidirectional images that are to be rendered to the group of viewers.

A video streaming server can transmit image layers in multiple video sub-streams at different spatiotemporal resolutions to downstream recipient devices, instead of encoding and transmitting omnidirectional images in their entire spatial areas at fixed high spatiotemporal resolutions using an extremely large bandwidth budget (e.g., equivalent to 18 4K video streams, etc.). As used herein, spatiotemporal resolution may refer to spatial resolutions only (including but not limited to high spatial frequency content), temporal resolutions only (including but not limited to frame rates), or a combination of spatial resolutions and temporal resolutions. Accordingly, the techniques as described herein can be used to reduce or minimize the amount of omnidirectional video content to be streamed between a video streaming server and a video streaming client, thereby reducing or minimizing the need for using a relatively large bandwidth budget to stream omnidirectional video content and efficiently supporting a wide variety of video streaming applications to a wide variety of downstream devices.

At the same time, the techniques as described herein can be used to allow a user of a downstream recipient device to freely vary the user's viewing angles or fields of view to the omnidirectional images. In most if not all operating scenarios, the user can be presented with high-resolution omnidirectional video content for a seamless viewing experience that is relatively free from visual artifacts, physiological discomforts, etc., associated with some other approaches that do not adopt the techniques as described herein. The visual artifacts, physiological discomforts, etc., associated with the other approaches may include, but are not necessarily limited to, any of: motion artifacts such as unable to maintain smooth pursuit, prolonged lags in transitioning to high resolution imagery as perceived by the human vision, low resolution imagery noticeable within a focal viewing area of the human vision, mismatches between a user's natural vision-related intuition and omnidirectional video content as actually rendered to the user, sudden drop of visual clarity in imagery when a viewer moves viewing angles, perceptible slow transitioning from low resolutions to high resolutions, showing fuzzy images for previously occluded image details when a viewer moves viewing angles, etc.

Example embodiments described herein relate to rendering omnidirectional video. A first reconstructed omnidirectional image is rendered at a first time point to a viewer. The first reconstructed omnidirectional image is generated from a first plurality of image layers received from a video streaming server. The first plurality of image layers is generated by the video streaming server from a first omnidirectional image in reference to a first view direction of the viewer. View direction data of the viewer is collected in real time while the viewer is viewing the rendered first reconstructed omnidirectional image. The view direction data is used to determine a second view direction of the viewer. At least a part of the view direction data is sent to the video streaming server to cause the video streaming server to generate a second plurality of image layers from a second omnidirectional image in reference to the second view direction of the viewer. The second plurality of image layers comprises (a) a focal-vision image layer that has a focal-vision spatial resolution and that covers at least the viewer's foveal vision field region, (b) a peripheral-vision image layer that has a peripheral-vision spatial resolution lower than the focal-vision spatial resolution and that covers at least a part of the viewer's peripheral vision field region, etc. The second plurality of image layers is received from the video streaming server. A second reconstructed omnidirectional image is generated from the second plurality of image layers. The second reconstructed omnidirectional image is rendered at a second time point later than the first time point to the viewer. Additionally, optionally or alternatively, the second reconstructed omnidirectional image and zero or more subsequent reconstructed images can be generated momentarily from the first plurality of images till the second plurality of images are received.

Example embodiments described herein relate to streaming omnidirectional video. A first plurality of image layers is streamed to a video streaming client. The first plurality of image layers is generated from a first omnidirectional image in reference to a first view direction of a viewer. At least a part of view direction data of the viewer collected in real time is received while the viewer is viewing a first reconstructed omnidirectional image generated from the first plurality of image layers. The view direction data indicates a second view direction of the viewer. A second plurality of image layers is generated from a second omnidirectional image in reference to the second view direction of the viewer. The second plurality of image layers comprises: (a) a focal-vision image layer that has a focal-vision spatial resolution and covers at least the viewer's foveal vision field region, (b) a peripheral-vision image layer that has a peripheral-vision spatial resolution lower than the focal-vision spatial resolution and covers at least a part of the viewer's peripheral vision field region, etc. The second plurality of image layers is transmitted to the video streaming client.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. The Human Vision Field

Techniques as described herein can be implemented based on the knowledge of the (human) eye and how the eye perceives spatial resolution, spatial structures, luminance, colors, changes (e.g., movements, flashing, pulsation, fluctuation, disturbance, etc.) in perceptible visual characteristics, etc.

There are two types of photoreceptors—known as cones and rods—that are present in the eye, as illustrated in FIG. 1A. By way of illustration but not limitation, distributions of cones and rods in FIG. 1A represents those in an average viewer (or the human vision system). Individual viewers may have different vision characteristics that may deviate from the distributions as depicted in FIG. 1A. Techniques as described herein can be used to apply to an individual viewer based on the individual viewer's specific vision characteristics or distributions of cones and rods. Techniques as described herein can also be used to apply to a user population based on average or collective vision characteristics. Cones are responsible for the highest spatial acuity and color vision in the eye's foveal vision field region and for relatively high spatial acuity and color vision in the eye's macular vision field region, etc. Techniques as described herein can be used: to provide pixel values with the highest spatial resolution, a focal-vision frame rate, the highest dynamic range (in luminance), the widest color gamut, etc., for the eye's foveal vision field region, and to provide pixel values with relatively high spatial resolution(s), peripheral-vision and/or non-vision-field frame rate(s), relatively high dynamic range(s), relatively wide color gamut(s), etc., for the eye's vision field region(s) that correspond to relatively high densities of cones.

Rods, on the other hand, do not mediate color vision and have a low spatial acuity, and are quantitatively significantly distributed outside of the eye's foveal vision field region. The rods are sensitive to spatial structures and changes (e.g., movements, flashing, pulsation, fluctuation, disturbance, etc.) in perceptible visual characteristics. Techniques as described herein can be used to provide pixel values with relatively low spatial resolution(s), peripheral-vision and/or non-vision-field frame rate(s), relatively low dynamic range(s), relatively narrow color gamut(s), etc., for the eye's vision field region(s) that correspond to relatively low densities of cones and/or relatively high densities of rods. Additionally, optionally or alternatively, techniques as described herein can be used to provide pixel values with different spatial resolution(s), different frame rate(s), different dynamic range(s), different color gamut(s), etc., for the eye's vision field region(s) that correspond to different densities of cones and/or different densities of rods.

Figure 1B:
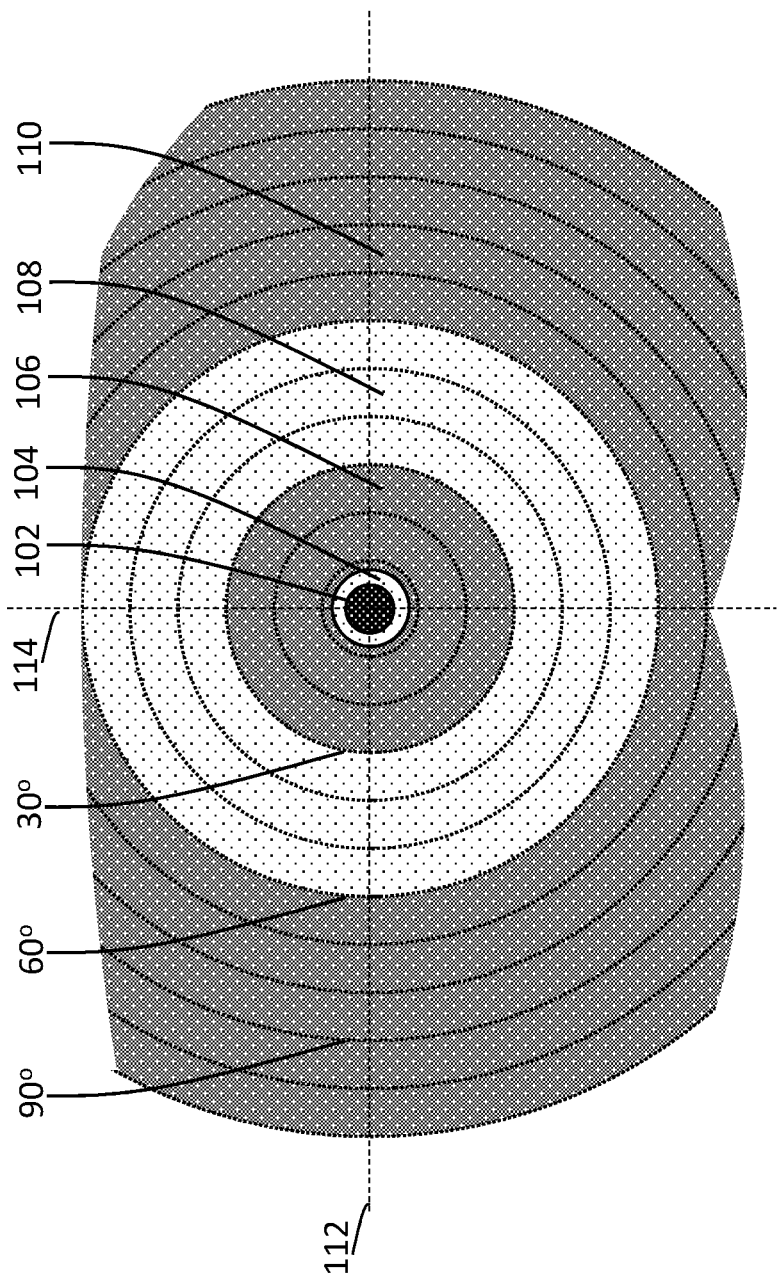
FIG. 1B illustrates an example angular vision field representation of the eye.

FIG. 1B illustrates an example representation of the (human) eye's vision field. Cone and rod distributions (in the eye) as illustrated in FIG. 1A can be segmented into different distribution ranges of cones and rods and further projected into an angular vision field representation (of the eye) as illustrated in FIG. 1B. By way of illustration but not limitation, vision field regions in FIG. 1B represents those in a vision field of an average viewer (or the human vision system). Individual viewers may have different vision characteristics, and thus may be segmented to vision field regions different from those depicted in FIG. 1B. Techniques as described herein can be used to apply to an individual viewer based on the individual viewer's specific vision field regions. Techniques as described herein can also be used to apply to a user population based on average or collective vision field regions.

By way of example but not limitation, the widest angular range in the eye's vision field is along the horizontal direction of FIG. 1B, which is parallel to the inter-pupil line between the viewer's two eyes, without considering visual constraints from facial anatomy, and may be approximately 180 angular degrees.

Each of concentric circles (e.g., labelled as 30°, 60°, 90°, etc.) represents directions of equal (or the same) angular degree relative to a view direction of the viewer's left or right eye. It should be noted that angles such as 30°, 60°, 90°, etc., are for illustration purposes only. Different values of angles or different set of angles can be used to define or describe a viewer's vision field. The view direction (not shown in FIG. 1B) is pointed vertically out of the plane of FIG. 1B at the intersection of a transverse direction 112 and a vertical direction 114 in a foveal region 102 (the darkest fill pattern). Here, the transverse direction (112) and the vertical direction (114) form a plane vertical to the view direction.

As illustrated in FIG. 1B, the vision field of the eye may be (e.g., logically, projected by certain partitions in the distributions of densities of rods/cones of FIG. 1A, etc.) partitioned into the foveal region (102) immediately surrounded by a paracentral region 104. In some embodiments, the foveal region (102) may correspond to the viewer's fovea vision and extend from zero (0) angular degree to a first angle (e.g., 3-7 angular degrees, 5-9 angular degrees, etc.) relative to the view direction. In some embodiments, the paracentral region (104) may extend from the first angle to a second angle (e.g., 6-12 angular degrees, etc.) relative to the view direction.

The paracentral region (104) is immediately surrounded by a near-peripheral region 106. The near-peripheral region (106) is immediately adjacent to the mid-peripheral region (108), which in turn is immediately adjacent to the rest of the vision field, a far-peripheral region 110. In some embodiments, the near-peripheral region (106) may extend from the second angle to a third angle (e.g., 25-35 angular degrees, etc.) relative to the view direction. In some embodiments, the mid-peripheral region (108) may extend from the third angle to a fourth angle (e.g., 50-65 angular degrees, etc.) relative to the view direction. The far-peripheral region (610) may extend from the fourth angle to the edge of the vision field.

The first, second, third and fourth angles used in this example logical partition of the vision field may be defined or specified along the transverse direction (112). When the vision field of FIG. 1B corresponds to that at a front level viewing direction, the transverse direction (112) may be the same as, or parallel to, the viewer's interpupil line.

It should be noted that different schemes of logically partitioning a viewer's vision field may be used in addition to, or in place of, the scheme of logically partitioning the viewer's vision field into foveal, paracentral, near-peripheral, mid-peripheral, far-peripheral, etc., regions based on angles as illustrated in FIG. 1B.

For example, in some embodiments, the viewer's vision field may be partitioned into more or fewer regions such as a combination of a foveal region, a near-peripheral region and a far-peripheral region, etc., without a paracentral region and/or a mid-peripheral region. A high spatial resolution image layer may be used to cover from the foveal region up to some or all of the near-peripheral region in such logical partition of the viewer's vision field.

In some embodiments, the viewer's vision field may be partitioned based on other quantities other than angles as previously illustrated. For example, in a non-limiting implementation, the foveal region may be defined as a vision field region that corresponds a viewer's foveal vision. The paracentral region may be defined as a vision field region that corresponds a viewer's retina area where cone/rod densities exceed relatively high cone/rod density thresholds. The near-peripheral region may be defined as a vision field region that corresponds a viewer's retina area where cone/rod densities does not exceed relatively high cone/rod density thresholds respectively but does exceed intermediate cone/rod density thresholds. The mid-peripheral region may be defined as a vision field region that corresponds a viewer's retina area where cone/rod densities does not exceed intermediate cone/rod density thresholds respectively but does exceed relatively low cone/rod density thresholds. A focal-vision region as described herein may cover from the viewer's foveal vision up to some or all of a region (e.g., some or all of the viewer's near-peripheral vision, etc.) based on threshold(s) (e.g., cone/rod density threshold(s), etc.) that are not necessarily angle-based.

Additionally, optionally or alternatively, a combination of two or more different schemes of logically partitioning the viewer's vision field and/or other human vision factors may be used to determine a focal-vision region of the viewer's vision field. For example, instead of using a focal-vision region as described herein to cover the same angular value range in different angular directions, the focal-vision region as described herein may cover a larger angular value range along the transverse direction (112) than an angular value range covered by the focal-vision region along the vertical direction (114), as the human vision system may be more sensitive to image details along the transverse direction (112) than those along the vertical direction (114).

In some embodiments, a focal-vision region as described herein covers some or all of: a foveal region (e.g., plus a safety margin, etc.), a paracentral region (e.g., excluding and extending from the foveal region, etc.), a near-peripheral region (e.g., further excluding and extending from the paracentral region, etc.), a mid-peripheral region (e.g., further excluding and extending from the near peripheral region, etc.), etc.

In some embodiments, a focal-vision region as described herein covers a symmetric angular range representing a symmetric (to the viewer's view direction) region of the wide angular range. Examples of the focal-vision region may include, but are not necessarily limited to, one of: +/−15 angular degrees, +/−20 angular degrees, +/−25 angular degrees, etc., relative to the viewer's view direction.

In some embodiments, a focal-vision region as described herein covers an asymmetric angular range representing an asymmetric (to the viewer's view direction) region of the wide angular range. An asymmetric angular range in a vision field of one eye may be defined or specified as covering from an interior angle (looking towards the other/conjugate eye) to an exterior angle (looking away from the other/conjugate eye).

In some implementation examples, the asymmetric angular range is biased with a preference towards interior directions overlapped in both vision fields of the viewer's left and right eyes. Examples of the interior angle of the asymmetric angular range with bias to interior angles may include, but are not necessarily limited to, one of: 15 angular degrees, 30 angular degrees, 45 angular degrees, etc., relative to the viewer's view direction. Examples of the exterior angle of the asymmetric angular range with bias to interior angles may include, but are not necessarily limited to, one of: 10 angular degrees, 15 angular degrees, 20 angular degrees, etc., relative to the viewer's view direction.

In some implementation examples, the asymmetric angular range is biased with a preference towards exterior directions which may or may not be overlapped in both vision fields of the viewer's left and right eyes. Examples of the exterior angle of the asymmetric angular range with bias to exterior directions may include, but are not necessarily limited to, one of: 15 angular degrees, 30 angular degrees, 45 angular degrees, etc., relative to the viewer's view direction. Examples of the interior angle of the asymmetric angular range with bias to exterior directions may include, but are not necessarily limited to, one of: 10 angular degrees, 15 angular degrees, 20 angular degrees, etc., relative to the viewer's view direction.

Additionally, optionally or alternatively, in some embodiments, a vision field of an eye as described herein takes into consideration vision-related factors such as eye swiveling, viewing constraints from nose, corneal, eyelid, etc.

Examples of a focal-vision region as described herein may include, but are not necessarily limited to, any combination of one or more of: circular shapes, oblong shapes, oval shapes, heart shapes, star shapes, round shapes, square shapes, etc.

3. Omnidirectional Video User Experience Based on View Direction Tracking

In some embodiments, only a (e.g., relatively small, etc.) focal-vision region of the eye's vision field needs to be provided with pixel values with the highest (or sharpest) spatial resolution, a focal-vision frame rate, the highest dynamic range, the widest color gamut, etc. In some embodiments, the focal-vision region of the eye's vision field may correspond to (e.g., exactly, approximately, no less than 95% of, no more than 105% of, etc.) the entirety of the foveal vision of the eye up to some or all of near-peripheral vision of the eye. In some embodiments, the focal-vision region of the eye's vision field may additionally include a safety vision field region.

In some embodiments, the size and/or shape of the safety vision field region in the focal-vision region can be preconfigured to a fixed size (e.g., 0%, 5%, 10%, −5%, −10%, etc.) that does not vary with network bandwidth, image content, types of computing devices (e.g., helmet mounted display devices, small form factor computing devices such as credit card size plugin devices, wall displays, etc.) involved in omnidirectional video applications, types of rendering environments (e.g., cloud-based video streaming servers, video streaming servers collocated with video streaming clients, video streaming servers connected with video streaming clients over local wireless connections, etc.) involved in omnidirectional video applications, etc.

In some other embodiments, the size and/or shape of the safety vision field region in the focal-vision region can be dynamically reconfigured at runtime, and can vary in a range (e.g., from −10% to 10%, from −5% to 5%, from 0% to 5-10%, etc.) with one or more of: network bandwidth, image content, types of computing devices (e.g., helmet mounted display devices, small form factor computing devices such as credit card size plugin devices, wall displays, etc.) involved in omnidirectional video applications, types of rendering environments (e.g., cloud-based video streaming servers, video streaming servers collocated with video streaming clients, video streaming servers connected with video streaming clients over local wireless connections, etc.) involved in omnidirectional video applications, etc.

For example, in response to determining that network connections do not support a relatively high bandwidth, the size and/or shape of the safety vision field region may be dynamically shrunk at runtime from 10% to 5% over the eye's foveal vision. On the other hand, in response to determining that network connections do not support a relatively high bandwidth, the size and/or shape of the safety vision field region may be dynamically expanded at runtime from 5% to 10% over the eye's foveal vision.

The size and/or shape of the safety vision field region may also be set in dependence on latency in eye tracking. For example, the user's view direction at runtime may be tracked by a view direction tracking device. The view direction tracking device may operate in real time with a display on which a sequence of omnidirectional images is rendered, for example, through layered representations of the omnidirectional images as generated under techniques as described herein. As the user changes view directions and/or viewing distances from time to time, the view direction tracking device tracks and computes the viewing angles and/or viewing distances in a coordinate system in which the sequence of omnidirectional images is being rendered, generates a time sequence of view directions, and signals each view direction in the time sequence of view directions to a video streaming server as described herein. Each such signaled view direction of the viewer as received by the video streaming server may be indexed by a time point value. The time point value may be associated or correlated by a video streaming server as described herein with a specific omnidirectional image in the sequence of omnidirectional images.

View direction data may be collected, analyzed and/or shared/transmitted among view direction tracking devices and streaming devices with relatively low latency (e.g., within a fraction of one image frame time, within 5 milliseconds, etc.). In an example implementation, the view direction tracking data may be shared among these devices using the lowest latency data/network connections where multiple data/network connections are available.

In response to determining the viewer's view direction relatively expeditiously with relatively low latency (e.g., within a fraction of an image frame time, etc.) based on the view direction data, a video streaming server (e.g., implemented with one or more upstream devices, etc.) may dynamically shrink the size and/or shape of the safety vision field region at runtime from 10% to 5% over the eye's foveal vision. A relatively small area (e.g., within 20 angular degrees from the view direction, etc.) of the highest spatial resolution, the focal-vision frame rate, the highest dynamic range, the widest color gamut, etc., may be sent in the video signal to the downstream recipient device.

On the other hand, in response to determining the viewer's view direction relatively slowly with relatively high latency (e.g., exceeding a time threshold, more than the fraction of one image frame time, longer than 5 milliseconds, etc.) based on the view direction data, the video streaming server may dynamically expand the size and/or shape of the safety vision field region at runtime from 1% to 3%, 2% to 6%, 5% to 10%, etc., over the eye's foveal vision. A relatively large area (e.g., up to 30 angular degrees from the view direction, etc.) of the highest spatial resolution, the focal-vision frame rate, the highest dynamic range, the widest color gamut, etc., may be sent in the video signal to the downstream recipient device. That way, the recipient device of the video signal can have sufficient image data over a relatively large focal-vision region to make local decisions based on the view directions for image rendering purposes.

Omnidirectional images as described herein can be captured/generated with one or more camera systems deployed in one or more spatial environments. Example spatial environments may include, but are not limited to only, any of: physical spatial environment, simulated spatial environment, movie studios, outdoor scenes, indoor scenes, tunnels, streets, vehicles, ships, aircrafts, outer space, etc. Example camera systems may include, but are not limited to only, any of: light field cameras, multiple cameras with overlapping and/or non-overlapping fields of vision, digital cameras, analog cameras, webcams, etc.

In some embodiments, the omnidirectional image may represent one individual high-resolution omnidirectional image in a sequence of (e.g., high-resolution, etc.) omnidirectional images. A video streaming server may be configured to receive and use the received sequence of omnidirectional images as input to prepare omnidirectional video content for streaming to (downstream) video streaming clients in support of one or more of: video display applications, VR applications, AR applications, automobile entertainment applications, remote presence applications, display applications, etc.

An omnidirectional image as described herein can be represented in any of a wide variety of coordinate systems such as a World coordinate system, a coordinate system stationary to a camera system, a coordinate system fixed relative to a spatial environment, etc. A spatial position in the omnidirectional image may be either an absolute position (e.g., represented in the World coordinate system, etc.) or a relative position (e.g., represented in a relative coordinate system stationary to the camera system, etc.).

In some embodiments, a spatial position (e.g., a pixel, etc.) in the omnidirectional image can be represented by a set of specific (x, y) coordinate values. By way of example but not limitation, the x coordinate value of the specific (x, y) coordinate values may correspond to a specific longitudinal degree (ranging from 0 to 360 angular degrees) in the omnidirectional image representation in a 3D space, whereas the y coordinate value of the (x, y) coordinate values may correspond to a specific latitudinal degree (ranging from 0 to 180 angular degrees) in the omnidirectional image representation in the 3D space. In various embodiments, geometric transformations can be used to transform a set of (e.g., x, y) coordinate values of a spatial position in one omnidirectional image representation into another set of (e.g., pitch, roll, yaw, sway, heave, surge, etc.) coordinate values of the same position in other omnidirectional image representations such as the omnidirectional image representation, etc.

4. Layered Representation for Omnidirectional Images

Figure 2A:
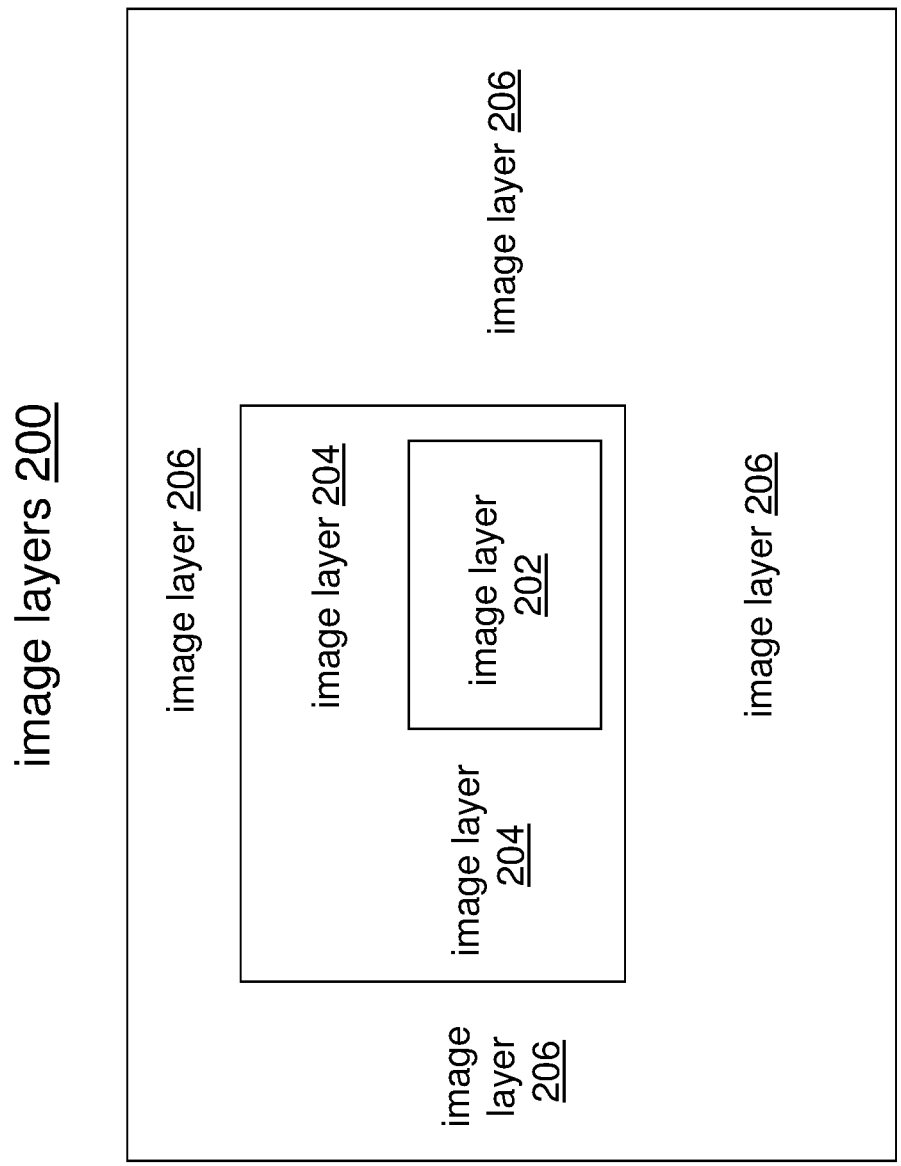
FIG. 2A and FIG. 2B illustrate example image layers representing an omnidirectional image.

FIG. 2A illustrates an example layered representation for an omnidirectional image. The layered representation for the omnidirectional image comprises a plurality of image layers 200. The plurality of image layers comprises N (e.g., 2, 3, 4, 5, etc.) image layers, where N is no less than two (2). Instead of directly encoding the omnidirectional image, the plurality of image layers (200) is encoded into a video signal that can be transmitted from one or more upstream devices (e.g., video streaming server(s), etc.) to a downstream recipient device (e.g., a video streaming client, etc.).

An image layer may logically represent an image frame containing a set of pixel values at a set of pixels (or positions) in the omnidirectional image. Individual shapes (e.g., rectangle, polygonal shapes, regular shapes, irregular shapes, etc.) and individual sizes of image layers and/or corresponding buffers used to store the image layers may be reshaped or resized dynamically, for example, based on one or more of: network latencies, bandwidths, view direction movements, image content, etc. At the one or more upstream devices and/or at the recipient device, each image layer (or each image frame) in the plurality of image layers (200) may, but is not limited to only, be kept in a respective memory buffer in a plurality of memory buffers that stores the plurality of image layers (200). In some embodiments, some or all of the memory buffers may be refreshed collectively with a common frame rate. In some embodiments, at least some of the memory buffers may be refreshed individually with their own frame rates. In some embodiments, image data in different memory buffers as described herein may be compressed collectively, individually or separately. In some embodiments, different memory buffers storing different image layers may be located in different computing devices of one or more content delivery networks, one or more content distribution networks, one or more core networks, one or more access networks, etc. For example, a memory buffer storing a focal-vision image layer of a plurality of image layers representing an omnidirectional image may be kept relatively close (e.g., geographically, in network topology, in the same network, in the same service-provider network, in an access network, via a local WIFI or wireline network/data connection, over relatively few network hops, etc.) to the recipient device. Another memory buffer storing a non-focal-vision image layer of the same plurality of image layers representing the same omnidirectional image may be kept relatively further way (e.g., geographically, in network topology, in different networks, in different service-provider networks, in a core network, via one or more remote network/data connections, over relatively numerous network hops, etc.) from the recipient device.

At the one or more upstream devices, the omnidirectional image received as input for generating the plurality of image layers (200) may be kept in a separate input omnidirectional image buffer. At the recipient device, a reconstructed omnidirectional image reconstructed from the plurality of image layers (200) may be kept in a separate reconstructed image buffer. In some embodiments, the reconstructed image buffer may be used to drive/render image content derived from the omnidirectional image on the viewer's display device, and may be refreshed at a device-specific frame rate of the viewer's display device. The reconstructed omnidirectional image may, but is not limited to only, comprise image data that is actually rendered with the viewer's display device. Thus, the reconstructed omnidirectional image may only keep image data (possibly plus a safety margin) sufficient for image rendering in the viewer's field of view.

In embodiments in which different image layers that represent the omnidirectional image have different frame rates, these different image layers may be time synchronized, for example, to the frame rate of the viewer's display device. Image processing algorithms may be selected to perform this time synchronization among the image layers of different frame rates, in order to reduce or avoid visual artifacts. Additionally, optionally or alternatively, a peripheral-vision frame rate as described herein may be much higher than the focal-vision frame rate. A peripheral-vision image layer with the peripheral-vision frame rate may be used to generate timewise accurate visual features such as motions, flashing, pulsating, etc., in the viewer's peripheral vision.

The plurality of image layers (200) may comprise a focal-vision image layer that covers a focal-vision region of the eye's vision field. Image data in the focal-vision image layer may be cached and served out at a relatively high data rate to the downstream recipient device at upstream devices, content serving nodes, content caching nodes, etc., that are relatively close in spatial proximity or network topology proximity to the downstream recipient device. The focal-vision image layer may comprise pixel values of the highest spatial resolution, a focal-vision frame rate, the highest dynamic range, the widest color gamut, etc., as transmitted in a video signal from one or more upstream devices (e.g., cloud-based video streaming server(s), a set-top box, a local video streaming server, any combination of one or more of the foregoing, etc.).

The plurality of image layers (200) may comprise one or more non-focal-visionfocal-vision image layers that cover non-focal regions of the eye's vision field outside the focal-vision region of the eye's vision field. Image data in the non-focal-visionfocal-vision image layers may be cached and served out at a relatively low data rate to the downstream recipient device at upstream devices, content serving nodes, content caching nodes, etc., that are relatively far in spatial proximity or network topology proximity to the downstream recipient device. The non-focal-vision image layers may comprise pixel values of relatively low spatial resolution(s), non-focal-vision frame rate(s), relatively low dynamic range(s), relatively narrow color gamut(s), etc., as transmitted in the video signal from one or more upstream devices (e.g., cloud-based video streaming server(s), a set-top box, a local video streaming server, any combination of one or more of the foregoing, etc.). Additionally, optionally or alternatively, the non-focal-vision image layers may comprise pixel values of different (e.g., lower, higher, etc.) spatial resolution(s), different (e.g., lower, higher, etc.) frame rate(s), different (e.g., lower, higher, etc.) dynamic range(s), different (e.g., lower, higher, etc.) color gamut(s), etc., as transmitted in the video signal from one or more upstream devices (e.g., cloud-based video streaming server(s), a set-top box, a local video streaming server, any combination of one or more of the foregoing, etc.).

As a part of rendering the omnidirectional image to the viewer, the focal-vision image layer provides pixel values of the highest spatial resolution, the focal-vision frame rate, the highest dynamic range, the widest color gamut, etc., as transmitted in the video signal.

The pixel values in the focal-vision image layer may be rendered with the viewer's display device at the spatial resolution of the viewer's display device directly without spatial sampling, if the spatial resolution of the pixel values matches that of the viewer's display device. If the spatial resolution of the pixel values does not match that of the viewer's display device, spatial sampling operations (e.g., spatial downsampling, spatial upsampling, etc.) specific to the viewer's display device may be performed before rendering the pixel values of the focal-vision image layer on the viewer's image device.

The pixel values in the focal-vision image layer may be rendered with the viewer's display device at the frame rate of the viewer's display device (which may support one or more frame rates) directly without temporal sampling or frame rate conversion, if the frame rate of the pixel values matches a selected frame rate supported by the viewer's display device. If the frame rate of the pixel values does not match the selected frame rate supported by the viewer's display device, temporal sampling operations (e.g., temporal downsampling, temporal upsampling, frame rate conversion, etc.) specific to the viewer's display device may be performed before rendering the pixel values of the focal-vision image layer on the viewer's image device.

In the meantime, as a part of rendering the omnidirectional image to the viewer, the non-focal-vision image layers may provide, for example in the viewer's peripheral vision, pixel values of relatively low spatial resolution(s), non-focal-vision frame rate(s), relatively low dynamic range(s), relatively narrow color gamut(s), etc., as transmitted in the video signal.

In some embodiments, the pixel values in the non-focal-vision image layers may not be rendered with the viewer's display device at the spatial resolution of the viewer's display device, if the spatial resolution of the pixel values in the non-focal-vision image layers are lower than that of the viewer's display device, even if the spatial resolution of the pixel values in the focal-vision image layer matches that of the viewer's display device. Spatial upsampling may be applied to the pixel values in the non-focal-vision image layers before the upsampled pixel values are rendered in the viewer's display device. Additionally, optionally or alternatively, spatial sampling operations (e.g., downsampling, upsampling, etc.) specific to the viewer's display device may be performed before rendering the pixel values of the focal-vision image layer on the viewer's image device.

In some embodiments, the pixel values in the non-focal-vision image layer may not be rendered with the viewer's display device at the frame rate of the viewer's display device, if the frame rates of the pixel values in the non-focal-vision image layers do not match the selected frame rate of the viewer's display device, even if the frame rate of the pixel values in the focal-vision image layer matches the selected frame rate of the viewer's display device. Temporal sampling may be applied to the pixel values in the non-focal-vision image layers before the upsampled pixel values are rendered in the viewer's display device. Additionally, optionally or alternatively, temporal sampling operations (e.g., temporal downsampling, temporal upsampling, frame rate conversion, etc.) specific to the viewer's display device may be performed before rendering the pixel values of the focal-vision image layer on the viewer's image device.

To provide to a downstream recipient device with a video signal comprising a plurality of image layers (e.g., 200 of FIG. 2A, etc.) representing an omnidirectional image, one or more upstream devices may be configured to receive the omnidirectional image (e.g., in an input, from scene-referred images acquired by one or more camera systems, from a non-transitory storage, from a video source, from a source video signal, from a studio released version, etc.) with a spatial resolution no less than the highest spatial resolution of all the image layers generated by the one or more upstream devices to represent the omnidirectional image. Additionally, optionally or alternatively, the omnidirectional image in the input to the one or more upstream devices may have a frame rate no less than the highest frame rate of all the image layers, a dynamic range no less than the highest dynamic range of all the image layers, a color gamut no narrower than the widest color gamut of all the image layers, etc.

The one or more upstream devices may receive—directly or indirectly from a view direction tracking device—at least a part of view direction data collected from the viewer in an omnidirectional video application of which the omnidirectional image is a part. The one or more upstream devices may receive or otherwise determine the viewer's view directions at a plurality of time points as a function of time.

Based on a view direction of the viewer determined for the omnidirectional image, the one or more upstream device can generate the plurality of image layers (200) to represent the omnidirectional image and can further determine to which vision field region of the eye of the viewer (relative to the view direction) each image layer in the plurality of image layers (200) corresponds.

Based on a specific vision field region to which each image layer in the plurality of image layers (200) corresponds, the one or more upstream devices may generate a set of pixel values for pixels (or positions) represented in the image layer. The set of pixel values may be encoded into an input video signal to be transmitted to the downstream recipient device for the viewer. The set of pixel values may be set in the input video signal to specific spatial resolution, specific frame rate, specific dynamic range, specific color gamut, etc., depending on the specific vision field region of the viewer. Some or all of the specific spatial resolution, the specific frame rate, the specific dynamic range, the specific color gamut, etc., may be (e.g., functionally, analytically, algebraically, linearly proportionally, non-analytically, arithmetically, step-wise proportionally, variably, etc.) dependent on densities of cones and/or rods in the eye in the specific vision field region of the viewer.

Thus, different image layers in the plurality of image layers (200) representing the omnidirectional image may be set to respective spatial resolutions, respective frame rates, respective dynamic ranges, respective color gamuts, etc. Additionally, optionally, or alternatively, the setting of different image layers of the omnidirectional image to respective spatial resolutions, respective frame rates, respective dynamic ranges, respective color gamuts, etc., may be independent of, or may not be limited by, aspect ratios of the viewer's display device on which a reconstructed omnidirectional image generated from the plurality of image layers (200) are rendered.

However, in some other embodiments, image layer(s) of the omnidirectional image outside the field of view that can be rendered by the viewer's display device may be set to default spatial resolution(s), default different frame rate(s), default dynamic range(s), default color gamut(s), etc. These image layer(s) may be used for rendering purposes in operational scenarios in which the viewer (e.g., relatively fast) changes the viewer's view direction.

By way of example but not limitation, in some embodiments, only a focal-vision image layer (e.g., within a 30 angular degrees from the viewer's view direction, within a 20 angular degrees from the viewer's view direction, etc.) corresponding to the viewer's focal-vision region is set to the highest spatial resolution and the most accurate color representation in the input video signal as transmitted from the one or more upstream devices; the remaining image layers in the plurality of image layers (200) corresponding to the viewer's non-focal-vision regions (e.g., a mid-peripheral vision field region, a far-peripheral vision field region, etc.) can be set in the decreasing order of spatial resolution and color representation accuracy.

By way of example but not limitation, each image layer in the plurality of image layers representing an omnidirectional image may correspond to a different vision field region in the eye's vision field.

In some embodiments, the plurality of image layers (200) may comprise a focal-vision region in the viewer's vision field, a peripheral region in the viewer's vision field, an out-of-vision-field region not in the viewer's vision field, etc. In some embodiments, the focal-vision region, the peripheral region and the out-of-vision-field region may constitute the entirety of an omnidirectional image as described herein. In some embodiments, the peripheral region in the viewer's vision field may include, but are not necessarily limited to only, one or both of the viewer's mid-peripheral vision field region and the viewer's far-peripheral vision field region.

In some embodiments, the plurality of image layers (200) may comprise a focal-vision region in the viewer's vision field, a mid-peripheral region in the viewer's vision field, a far-peripheral region in the viewer's vision field, etc. In some embodiments, the mid-peripheral region and the far-peripheral region may constitute the entirety of the viewer's peripheral vision outside the focal-vision region.

In some embodiments, the focal-vision region, the mid-peripheral region and the far-peripheral region as described herein may correspond respectively to three regions of acuity in the viewer's eye. The focal-vision region (e.g., completely, substantially within a + or −5% safety margin, etc.) corresponds to the viewer's foveal vision and some or all of the viewer's near-peripheral vision. The mid-peripheral region (e.g., completely, substantially within a + or −5% safety margin, etc.) corresponds to the viewer's macular vision outside the foveal vision. The far-peripheral region (e.g., completely, substantially within a + or −5% safety margin, etc.) corresponds to the viewer's rest of retina vision outside the macular vision.

Instead of directly encoding (a relatively large amount of image data in) the omnidirectional image into an output video signal (which is the input video signal to the recipient device), the one or more upstream devices may downsample and/or compress most image layers in the plurality of image layers (200) but perform no or little downsampling on image data in the focal-vision image layer. The one or more upstream devices encode (i) the (no or little downsampled) image data in the focal-vision image layer and (ii) the downsampled and/or compressed image data in the most image layers into the output video signal (e.g., a multi-layer video signal, etc.) to be transmitted to the recipient device. In some embodiments, the image layers of the omnidirectional image (200) may be carried in a plurality of video sub-streams in the video signal (e.g., a video stream comprising the plurality of video sub-streams, etc.). For example, two different image layers in the plurality of image layers (200) may be carried in two different video sub-streams in the video signal.

By way of illustration but not limitation, the omnidirectional image may be partitioned into three image layers 202, 204 and 206, as shown in FIG. 2A. It should be noted that in various embodiments, the omnidirectional image may be partition to N (e.g., 2, 3, 4, 5, etc.) image layers, where N is no less than two (2).

In some embodiments, first image data in the first image layer (202) may be pixel accurate (e.g., 4K image data for a 4K display device, etc.). The term "pixel accurate" may mean that no or little upsampling is used to generate all pixel values in the first image layer (202) in order to render the first image layer (202) to the viewer, as all the necessary pixel values for rendering operations are provided in the first image data in the first image layer (202) as transmitted from the one or more upstream devices. However, it should be noted that, if the spatial or temporal resolution of the first image layer (202) is different from a selected spatial or temporal resolution of the first image layer (202), some device-specific spatial or temporal sampling operations may still be performed for the purpose of adapting the spatial resolution (e.g., 8K resolution, 16K resolution, etc.) and the frame rate (e.g., 240 frames per second, 120 frames per second, 60 frames per second, etc.) of the first image layer (202) to those (e.g., 4K resolution, 120 frames per second, 60 frames per second, 24 frames per second, etc.) supported by the viewer's display device.

In some embodiments, second image data in the second image layer (204) and/or third image data in the third image layer (206) may not be pixel accurate (e.g., 1K or 2K image data for a 4K display device, etc.). Upsampling is used or needed to generate all necessary pixel values in the second image layer (204) and/or in the third image layer (206) in order to render the second image layer (204) and/or the third image layer (206) to the viewer, as not all the necessary pixel values for rendering operations are provided in the second image data in the second image layer (204) and/or in the third image data in the third image layer (206) as transmitted from the one or more upstream devices. Additionally, optionally or alternatively, some device-specific spatial or temporal sampling operations may be performed for the purpose of adapting the spatial resolutions and the frame rates of the second image layer (204) and the third image layer (206) to those supported by the viewer's display device.

In some embodiments, the first image layer (202) corresponds to a focal-vision region of the viewer's vision field as determined relative to the viewer's view direction at a time point at which the omnidirectional image is to be rendered. The viewer's view direction may be determined based on view direction data collected by a view direction tracking device collocated with the viewer in real time at runtime of the omnidirectional video application. The view direction tracking device may be a part of the recipient device or a separate device operating in conjunction with the recipient device. At least a part of the view direction tracking data that represents the viewer's view direction or that can be used to deduce/derive the viewer's view direction at the time point may be provided by the view direction tracking device to the one or more upstream devices that encode the image layers (e.g., 202, 204, 206, etc.) of the omnidirectional image into the video signal.

In some embodiments, the second image layer (204) and the third image layer (206) correspond respectively to (a) the viewer's mid-peripheral vision field region and (b) the viewer's far-peripheral vision field region, outside the focal-vision region.

In some other embodiments, the second image layer (204) and the third image layer (206) correspond respectively to (a) the viewer's mid-peripheral vision field region and the viewer's far-peripheral vision field region, outside the focal-vision region, and (b) an out-of-vision-field region (of the omnidirectional image) outside of the viewer's vision field.

In some embodiments, the second image layer (204) may have a lower spatial resolution than the first image layer (202) but may have a higher spatial resolution than the third image layer (206).

By way of illustration but not limitation, upsampling may be represented or characterized by a numeric scaling factor that is no less than one (1), whereas downsampling may be represented or characterized by a numeric scaling factor that is less than one (1). The greater the numeric scaling factor is, the less the spatial resolution of image data is before sampling (upsampling or downsampling). For example, a numeric scaling factor of a value 4 to be used by a recipient device in an upsampling operation on downsampled image data received from one or more upstream devices may indicate that (e.g., raw, pre-downsampled, etc.) image data received and downsampled by the one or more upstream devices to generate the downsampled image data may have a full (e.g., spatial, temporal, etc.) resolution that is four times the corresponding (e.g., spatial, temporal, etc.) resolution of the downsampled image data. In some embodiments, in order to be computationally efficient and low cost, (values of) the numeric scaling factors may be specifically selected to enable fast efficient arithmetic operation used in sampling operations (e.g., upsampling from 2K image data to 4K upsampled image data, etc.). Additionally, optionally or alternatively, sampling operations and operational parameters used in the sampling operations may be specifically selected to reduce or avoid generating visual artifacts in rendering omnidirectional images at the viewer's display device.

In some embodiments, spatial upsampling for the first image layer (202) may be represented by a first numeric scaling factor of one (1) or a no-op. Spatial upsampling for the second image layer (204) may be represented by a second numeric scaling factor (e.g., an integer, a ratio, etc.) greater than one (1). Spatial upsampling for the third image layer (206) may be represented by a third numeric scaling factor (e.g., an integer, a ratio, etc.). Spatial upsampling for an i-th (i is a positive integer up to N) image layer (206) may be represented by an i-th numeric scaling factor (e.g., an integer, a ratio, etc.).

For the purpose of illustration only, it has been described that a plurality of image layers (200) with varying spatial resolutions may be used to represent an omnidirectional image in a video signal from one or more upstream devices to a recipient device.

However, it should be noted that in various embodiments, a plurality of image layers (e.g., 200 of FIG. 2A, etc.) with varying image/video related properties other than spatial resolutions may be used to represent an omnidirectional image in a video signal from one or more upstream devices to a recipient device. The plurality of image layers (200) with varying values for any combination of one or more of: spatial resolutions, frame rates, dynamic ranges, color gamuts, etc., may be used to represent an omnidirectional image in a video signal from one or more upstream devices to a recipient device.

In some embodiments, a plurality of image layers (e.g., 200 of FIG. 2A, etc.) with varying frame rates may be used to represent an omnidirectional image in a video signal from one or more upstream devices to a recipient device.

In some embodiments, first image data in the first image layer (202) as transmitted from the one or more upstream devices may be encoded with a focal-vision frame rate (e.g., 24 frames per second, 60 frames per second, etc.).

In some embodiments, second image data in the second image layer (204) and/or third image data in the third image layer (206) may be encoded with frame rates different from the focal-vision frame rate. For example, a first frame rate used to encode the second image data may be much higher (e.g., two to ten times higher, etc.) than the focal-vision frame rate used to encode the first image data; the much higher frame rate provides more accurate motion information in the viewer's peripheral vision, as the human vision system is relatively sensitive to motions there. A second frame rate used to encode the third image data may be the same as, lower than, or higher than, the focal-vision frame rate used to encode the first image data. If the third image data is at least partly rendered in the viewer's peripheral vision, a much higher frame rate (e.g., higher than the focal-vision frame rate, lower than the first frame rate, higher than the first frame rate, etc.) is used to provide more accurate motion information in the viewer's peripheral vision. However, if the third image data (e.g., covering image content behind the viewer's head, etc.) is not rendered in the viewer's vision, a relatively low frame rate (e.g., higher than the focal-vision frame rate, lower than the first frame rate, lower than the focal-vision frame rate, etc.) as compared with the first frame rate is used to provide relatively low time-wise resolution.

In some embodiments, a plurality of image layers (e.g., 200 of FIG. 2A, etc.) with varying dynamic ranges may be used to represent an omnidirectional image in a video signal from one or more upstream devices to a recipient device.

In some embodiments, first image data in the first image layer (202) as transmitted from the one or more upstream devices may be encoded with the highest dynamic range.

In some embodiments, second image data in the second image layer (204) and/or third image data in the third image layer (206) may be encoded with dynamic ranges lower than the highest dynamic range. For example, bit depths used to encode the second image data and/or the third image data may be smaller than a bit depth used to encode the first image data. Quantization steps (e.g., quantization errors, coding errors, etc.) used to encode the second image data and/or the third image data may be larger than quantization steps used to encode the first image data. Additionally, optionally or alternatively, the second image data in the second image layer (204) may be encoded with a first dynamic range higher than a second dynamic range with which the third image data in the third image layer (206) is encoded.

In some embodiments, a plurality of image layers (e.g., 200 of FIG. 2A, etc.) with varying color gamuts may be used to represent an omnidirectional image in a video signal from one or more upstream devices to a recipient device.

In some embodiments, first image data in the first image layer (202) as transmitted from the one or more upstream devices may be encoded with the widest color gamut.

In some embodiments, second image data in the second image layer (204) and/or third image data in the third image layer (206) may be encoded with color gamuts narrower than the widest color gamut. For example, color spaces used to encode the second image data and/or the third image data may be smaller and/or contain fewer primary colors than a color space used to encode the first image data. Additionally, optionally or alternatively, the second image data in the second image layer (204) may be encoded with a first color space larger or having more primary colors than a second color space with which the third image data in the third image layer (206) is encoded.

In some embodiments, while the plurality of image layers (200) collectively covers the entirety of all spatial regions in the omnidirectional image, no two adjacent image layers in the plurality of image layers (200) have overlapping pixels (or positions) represented in the omnidirectional image.

In some other embodiments, two adjacent image layers in the plurality of image layers (200) may partly overlap spatially with each other. Pixel values for pixels in the partially overlapped sub-regions of the two adjacent image layers may be used for decontouring, debanding, anti-aliasing, etc., for the purpose of removing visual artifacts that could otherwise be introduced in boundaries of the adjacent image layers.

Figure 2B:
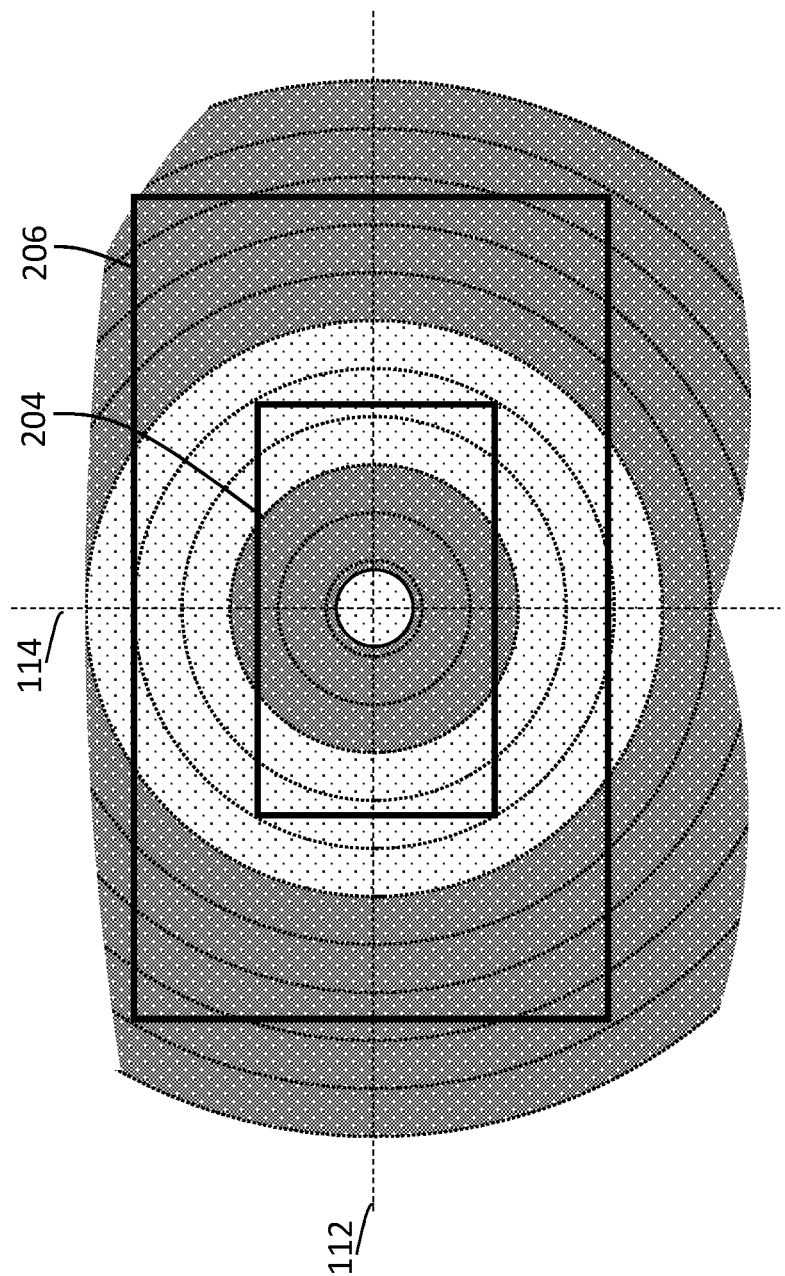

FIG. 2B illustrates an example plurality of image layers representing an omnidirectional image. The plurality of image layers may be encoded into a video signal from one or more upstream devices (e.g., video streaming server(s), etc.) to a downstream recipient device (e.g., a video streaming client, etc.).

In some embodiments, the image layers of the omnidirectional image may be carried in a multi-layer video signal. As used herein, an image layer as described herein may refer to a set of pixel values—for a set of pixels or positions in an omnidirectional image—encoded in a video signal (e.g., from one or more upstream devices to a downstream recipient device, etc.) with one or more of a specific spatial resolution, a specific frame rate, a specific dynamic range, a specific color gamut, etc.

As shown in FIG. 2B, the video signal may comprise a first image layer (e.g., 202, etc.) that covers a focal-vision region of the viewer's vision field, up to 30 angular degrees from the viewer's view direction. The focal-vision region of the viewer's vision field may include the entirety of the viewer's foveal vision up to some or all of the viewer's near-peripheral vision (and possibly even a safety region). In some embodiments, no or little upsampling operation is performed on the first image layer as received by the recipient device from the video signal.

The video signal may also comprise a second image layer (e.g., 204, etc.) that covers a mid-peripheral region of the viewer's vision field, up to 60 angular degrees from the viewer's view direction. The mid-peripheral region of the viewer's vision field may (e.g., entirely, substantially, approximately, etc.) lie outside the focal-vision region. In some embodiments, upsampling operation is performed on the second image layer as received by the recipient device from the video signal, as the second image layer may not comprise all pixel values at all pixel positions in the mid-peripheral region of the viewer's vision field.

Additionally, optionally or alternatively, the video signal may further comprise additional image layers (e.g., 206 of FIG. 2A, etc.) that cover regions outside the mid-peripheral region of the viewer's vision field and the focal-vision region. In some embodiments, upsampling operations are performed on the additional image layer as received by the recipient device from the video signal on an as-needed basis, if the viewer changes the view direction sufficiently to cause rendering at least a part of image data in the additional image layers. Additionally, optionally or alternatively, the additional image layers for peripheral vision field regions may have less color information (or less chrominance data).

Image layers of omnidirectional images (e.g., a sequence of omnidirectional images over a sequence of time points in a time interval, etc.) are dynamically determined/updated based on the view direction data that is available. The one or more upstream devices use the view direction data to determine the viewer's view direction in real time or near-real time, and to determine/update a plurality of image layers (e.g., 200 of FIG. 2A, etc.) for an omnidirectional image that is to be rendered to the viewer at a given time point.

In an omnidirectional video application, the viewer may occasionally make a head movement (e.g., rotation, translation, or a combination of rotation and translation, etc.) or otherwise move the viewer's field of view. The one or more upstream devices use the updated view direction data to determine the viewer's updated view direction in real time or near-real time, and to determine/update a plurality of image layers (e.g., 200 of FIG. 2A, etc.) for the next omnidirectional image that is to be rendered to the viewer at a subsequent time point (e.g., the immediate next time point, the second next time point immediately following the immediate next time point, etc.).

In some embodiments, the determination/update of image layers may, but is not required to, be strictly synchronous with changes in the viewer's view direction and/or changes in image content in omnidirectional images. Techniques as described herein can enable the upstream devices and the recipient device to operate with a (e.g., fixed, varying, etc.) time lag (or delay) between a change in the viewer's view direction as detected at the recipient device side and determining/updating image layers for subsequent omnidirectional images based on the change in the viewer's view direction at the upstream device side.

Image layers with different image properties (e.g., spatial resolutions, frame rates, dynamic ranges, color gamuts, etc.) may be kept in separate memory buffers. In some embodiments, these memory buffers may be updated with the same frame rate (or buffer refresh rate). In other embodiments, at least one of the memory buffers may be updated at a different frame rate (or buffer refresh rate) from frame rate(s) (or buffer refresh rate(s)) used to update the others of the memory buffers.

In some embodiment, the memory buffers may be updated with relatively moderate or slow frame rates (or buffer refresh rate(s)) (or with a relatively small number of frames per second), as compared with changes in the viewer's view direction and/or changes in image content in the omnidirectional images. The recipient device, or an image processing device operating in conjunction therewith, may be configured to locally adapt to the changes in the changes in the viewer's view direction and/or the changes in image content in the omnidirectional images at a relatively high frame rate (or buffer refresh rate) (or with a high number of frames per second) for the purpose of rendering subsequent omnidirectional images contemporaneous with the changes in the viewer's view direction.

5. View Direction Movements

Figure 2C:
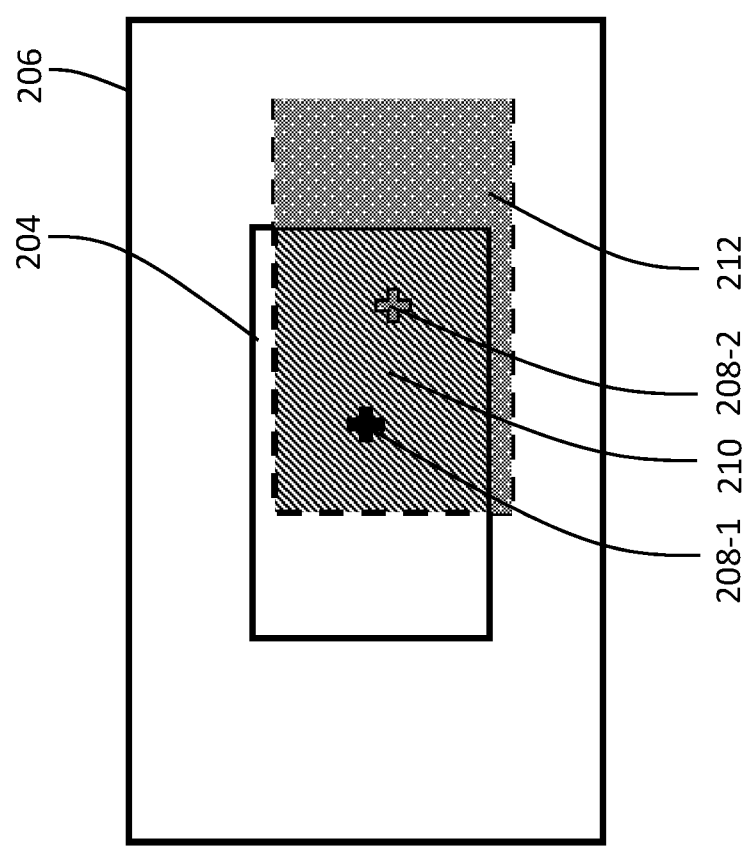
FIG. 2C illustrates example movement of view direction.

By way of example but not limitation, as illustrated in FIG. 2C, the viewer's view moves from a first view direction 208-1 to a second view direction 208-2. A first omnidirectional image to be rendered at a first time point may be represented by a first plurality of image layers generated by the one or more upstream devices in reference to the first view direction (208-1).

Due to latency in delivering/sharing view direction data and/or relatively slow network connections and/or relatively long image processing time, a second omnidirectional image to be rendered at a second time point immediately following the first time point may be represented by a second plurality of image layers generated by the one or more upstream devices still in reference to the first view direction (208-1).

To render the second omnidirectional image at the second time point, the recipient device (or an image processing device operating in conjunction therewith) may dynamically and locally generate an updated focal-vision image layer corresponding to a focal-vision region of the viewer's vision field in reference to the second view direction (208-2) by combining: (i) an image sub-region 210 (diagonal fill pattern) from a transmitted focal-vision image layer (which still corresponds to a focal-vision region of the viewer's vision field at the first time point) in the second plurality of image layers; and (ii) an image sub-region 212 (dot fill pattern) from other image layer(s) (which correspond to peripheral region(s) or non-focal-vision region(s) of the viewer's vision field at the first time point) in the second plurality of image layers that make up the second omnidirectional image.

In dynamically and locally generating the updated focal-vision image layer to cover the (actual) focal-vision region (in the viewer's vision field) at the second time point, pixel values of the image sub-region (212) may be upsampled, whereas pixel values of the image sub-region (210) may not be upsampled or may be much less upsampled as compared with the image sub-region (212).

In some embodiments, a recipient device comprises one or more image displays that render/display one or more images (e.g., a mono-view image, a left image, a right image, a set of images making up a multi-view image, etc.) of a mono-view image, a stereoscopic image, a multi-view image, etc.) at each of a plurality of time points. The recipient device may further comprises one or more view direction tracking devices that track and collect view direction data in real time at runtime for determining the viewer's view directions contemporaneous with the rendered/displayed images. Example view direction tracking devices may include, but are not necessarily limited to only: any of: (viewer) gaze tracking devices, (viewer) position tracking devices, (viewer) viewport tracking devices, (viewer) face tracking devices, (viewer) FOV tracking devices, etc. Example gaze tracking devices may, but are not limited to be, based on acquiring light absorption images/maps of the eye(s), gaze tracking devices based on acquiring light reflection images/maps of the eye(s), gaze tracking devices using one or more light wavelengths that can penetrate different depths in eye(s), etc. An eye gaze device as described herein may be personalized and/or calibrated to take into consideration the viewer's individual vision/gaze characteristics. Example position tracking devices may, but are not limited to be, based on inertia-based sensors, GPS-based sensors, motion sensors, accelerometers, etc. A position tracking device may track a viewer's position or motion up to six degrees of freedom such as linear displacements, angular displacements, linear motions or translations, angular motions or rotations, pitch, roll, yaw, sway, heave, surge, etc.

Besides using view direction data to generate image layers to represent omnidirectional images as described herein, some or all of the view direction data may be (additionally, optionally, or alternatively) used for other purposes such biometric detection, identity detection, personalization, authentication, etc. The view direction data can be used in conjunction with, or in place of, other personalized information such as fingerprint, iris characteristics, retina characteristics, etc.

For the purpose of illustration only, it has been described that image layers with one or more of different spatial resolutions, different frame rates, different dynamic ranges, different color gamuts, etc., may be generated, transmitted, received, decoded, etc., in a video signal to represent an omnidirectional image (e.g., in a time sequence of omnidirectional images in an omnidirectional video application, etc.). It should be noted that in various embodiments, image layers with other image related properties other than spatial resolutions, frame rates, dynamic ranges, color gamuts, etc., may be generated, transmitted, received, decoded, etc., in a video signal to represent an omnidirectional image as described herein. In an example, image layers with different peak-signal-noise-ratio (PSNR) may be generated, transmitted, received, decoded, etc., in a video signal to represent an omnidirectional image. Thus, different image layers may contain different levels of high spatial frequency image details. In another example, image layers with different image metadata may be generated, transmitted, received, decoded, etc., in a video signal to represent an omnidirectional image. Thus, different image layers may be processed differently by the recipient device with different transfer functions, different operational parameters, different mapping curves, different ranges, different image processing operations, different lookup tables (LUTs), etc.

Example image metadata may include, but is not necessarily limited to only, display management (DM) metadata. For example, different DM metadata for different image layers may be transmitted in the video signal from the one or more upstream devices to a recipient device. The different DM metadata may specify the same or different transfer functions to adapt image data in the different image layers to device-specific image rendering data that drive the viewer's display device. These transfer functions may map luminance related codewords, chrominance related codewords, etc., to device-specific digital drive values use to drive the viewer's display device. Different spatial locations of one or more displays of the viewer's display device may use different DM metadata to perform the mapping of the luminance related codewords, chrominance related codewords, etc. A handheld device with limited display capabilities may receive and use DM metadata different from DM metadata used and received by a head-mounted device with much greater display capabilities. Thus, in various embodiments, any of these and other image related metadata may be used in association with image layers as described herein, in addition to or in place of spatial resolution, frame rate, dynamic range, color gamut, PSNR, etc.

6. Baseline and Refinement Streaming Layers

A video signal as described herein may be transmitted or delivered from one or more upstream devices to a recipient devices in any combination of a wide variety of video transmission methods (e.g., H.264, HTTP files, HDMI video link, etc.).

For example, an image layer may be streamed from the one or more upstream devices to the recipient device over a streaming protocol such as related to H.264 SVC, dynamic adaptive streaming over HTTP (DASH), etc. In some embodiments, each image layer is transmitted with a single streaming layer.

In some embodiments, an image layer may be transmitted with more than one streaming layer. For example, the one or more upstream devices may generate a baseline streaming layer for an image layer from one or more omnidirectional images. Additionally, optionally or alternatively, the one or more upstream devices may generate one or more refinement streaming layers for the image layer from the one or more omnidirectional images.

If the image layer corresponds to a focal-vision image layer, the one or more upstream devices may send the baseline streaming layer as well as the one or more refinement streaming layers to the recipient device. On the other hand, if the image layer corresponds to a non-focal-vision image layer, the one or more upstream devices may send the baseline streaming layer with none or only a few of the one or more refinement streaming layers to the recipient device.

In some embodiments, a baseline streaming layer is streamed from the one or more upstream devices to the recipient device for the entirety of all spatial areas represented in each image layer generated from the one or more omnidirectional images. In some embodiments, a baseline streaming layer is streamed from the one or more upstream devices to the recipient device for the entirety of all spatial areas represented in one or more image layers generated from the one or more omnidirectional images. In some embodiments, a baseline streaming layer is streamed from the one or more upstream devices to the recipient device for the entirety of all spatial areas represented in the one or more omnidirectional images. Refinement streaming layers may be streamed from the one or more upstream devices to the recipient device based on where the present view direction of the viewer as determined from view direction data.

A refinement streaming layer for an image layer as described herein may be used by the one or more upstream devices to store refinement data relative to baseline data stored in a corresponding baseline streaming layer. Example refinement data may include, but is not necessarily limited to only, any of: residual data, complementary data, high spatial frequency content, high dynamic range image data, wide color gamut image data, etc.

The refinement data in the refinement streaming layer and the baseline data in the baseline streaming layer may be combined by the recipient device to generate image rendering data of a relatively high spatial resolution, a relatively high frame rate, a relatively high dynamic range, a relatively wide color gamut, a relatively high PSNR, additional image metadata, etc., as compared with image rendering data generated from the baseline data alone. Further, based on transmitting or using different numbers of refinement streaming layers for different image layers, the different image layers may be provided with different spatial resolutions, different frame rates, different dynamic ranges, different color gamuts, different PSNRs, different image metadata, etc. For example, a focal-vision image layer may contain image data of the highest spatial resolution; a mid-peripheral image layer may contain image data of the next highest spatial resolution; a far-peripheral image layer or non-vision-field image layer may contain image of the lowest spatial resolution.

Additionally, optionally or alternatively, refinement streaming layers can be used to support dynamic updates caused by changes in the viewer's view direction. For example, in response to determining that the viewer has moved the viewer's view direction into a present focal-vision field region away from an immediately preceding focal-vision field region represented by an immediately preceding focal-vision image layer, the one or more upstream devices may transmit a present focal-vision image layer comprising a baseline streaming layer as well as one or more refinement streaming layers to the recipient device. Furthermore, for the immediately preceding focal-vision field region that is no longer the present focal-vision field region, the one or more upstream devices may send none or only a few of one or more refinement streaming layers.

In some operating scenarios, transmitting refinement data for the focal-vision image layer in refinement layer(s) in response to the viewer's view direction may occur within a fraction of an image frame time from the one or more upstream devices to the recipient device. As used herein the image frame time refers to a time interval (e.g., ½4 second at a device-specific frame rate of 24 frames per second, etc.) allocated for rendering an image at a specific frame rate.

By way of illustration but not limitation, in an operational scenario (e.g., a local video streaming server to a headset device of a viewer, etc.) in which a video streaming server (e.g., the one or more upstream devices, collocated with the recipient device, located over a local WIFI connection with the recipient device, etc.) is operatively linked to the recipient device over a relatively high bandwidth (e.g., over 10 M bits per second, over 50 M bits per second, relatively low latency data/network connection, the video streaming server may be configured to receive/determine the viewer's (present) view direction relatively quickly (e.g., 1 millisecond, 5 milliseconds, etc.). The video streaming server may be computationally powerful enough to perform most of computations or image processing operations in an omnidirectional video application and to generate/fetch refinement data corresponding to the present view direction of the viewer and update the recipient device (which may be a wearable computing device, a credit-card size plugin, a Chromecast like device, etc.) for the next immediate omnidirectional image.

On the other hand, in an operational scenario (e.g., a cloud-based video streaming server to a headset device of a viewer, etc.) in which a video streaming server (e.g., the one or more upstream devices, remote to the recipient device, located in the network cloud over a multiple-hop network path with the recipient device, etc.) is operatively linked to the recipient device over a relatively low bandwidth, relatively high latency data/network connection, the video streaming server may be configured to receive/determine the viewer's view direction relatively slowly on a delay basis (e.g., exceeding a fraction of an image frame time, exceeding one or more image frame times, etc.). The recipient device may be configured to (e.g., at least momentarily, etc.) locally perform upsampling, etc., to make up the lack of high quality image data in a focal-vision image layer that is generated based on the viewer's previous view direction. In some embodiments, the locally upsampled image data in the viewer's present focal-vision region in the viewer's vision field may lack color accuracy. Over the time, the recipient device may obtain refinement data corresponding to the present view direction of the viewer and render high quality image data (e.g., spatial acuity, accurate colors, etc.) available from both baseline and refinement streaming layers.

In some embodiments, one or more refinement streaming layers may be used to carry stereoscopic image data or multi-view image data. For example, a baseline streaming layer and zero or more refinement streaming layers as described herein may be used to carry monoscopic image data (e.g., for left eye, for right eye, for a middle perspective, etc.) of an omnidirectional image. One or more additional refinement streaming layers may carry residual image data, disparity map data, etc., in reference to the monoscopic image data, for supporting stereoscopic or multi-view omnidirectional video application. The recipient device receiving the baseline streaming layer and all the refinement streaming layers may combine the monoscopic image data, the residual image data, the disparity map data, etc., for the purpose of generating left and right images of a stereoscopic image, a set of images that make up a multi-view image, etc.

In some embodiments, the viewer may obtain various interactive, non-interactive, 3D, 2D, multi-view user experience in omnidirectional video applications implemented with techniques as described herein. By way of example but not limitation, a user may first play a role in a 3D interactive omnidirectional video application (e.g., an interactive game application, etc.). Afterwards, the user (or viewer) may watch how the viewer performs in a 2D or 3D non-interactive omnidirectional video application.

For the purpose of illustration, it has been described that a viewer's view direction at a given time may be determined based on view direction data collected/tracked while the viewer is viewing omnidirectional video content. Additionally, optionally or alternatively, a viewer's view direction at a given time may be predicted. For example, in some embodiments, one or more upstream devices may measure network latencies between the one or more upstream devices and a downstream recipient device. The one or more upstream devices may also determine the viewer's movements (e.g., in six degrees of freedom, in rotations, in translations, in a combination of rotations and translations, etc.). Based on the network latencies and the viewer's movements, the one or more upstream device may predict a view direction of the viewer at a subsequent time point. The one or more upstream devices may generate specific image layers to be rendered at the subsequent time point in reference to the predicted view direction. The image layers may comprise image data with the highest spatial acuity at a predicted focus-vision region in the viewer's vision field in reference to the predicted view direction.

In some embodiments, a downstream device may determine the viewer's movements (e.g., in six degrees of freedom, in rotations, in translations, in a combination of rotations and translations, etc.). Based on the viewer's movements, the downstream device may predict a view direction of the viewer at a subsequent time point. Based on the predicted view direction the downstream device may adapt a plurality of image layers that have been received based on a different view direction from the predicted view direction to generate a focus-vision image portion to be rendered at the subsequent time point in reference to the predicted view direction. Additionally, optionally or alternatively, the downstream device may request and receive refinement image data from one or more upstream device to provide additional image data for the purpose of generating the focus-vision image portion with the highest spatial acuity.

7. Example Video Streaming Servers and Clients

Figure 3A:
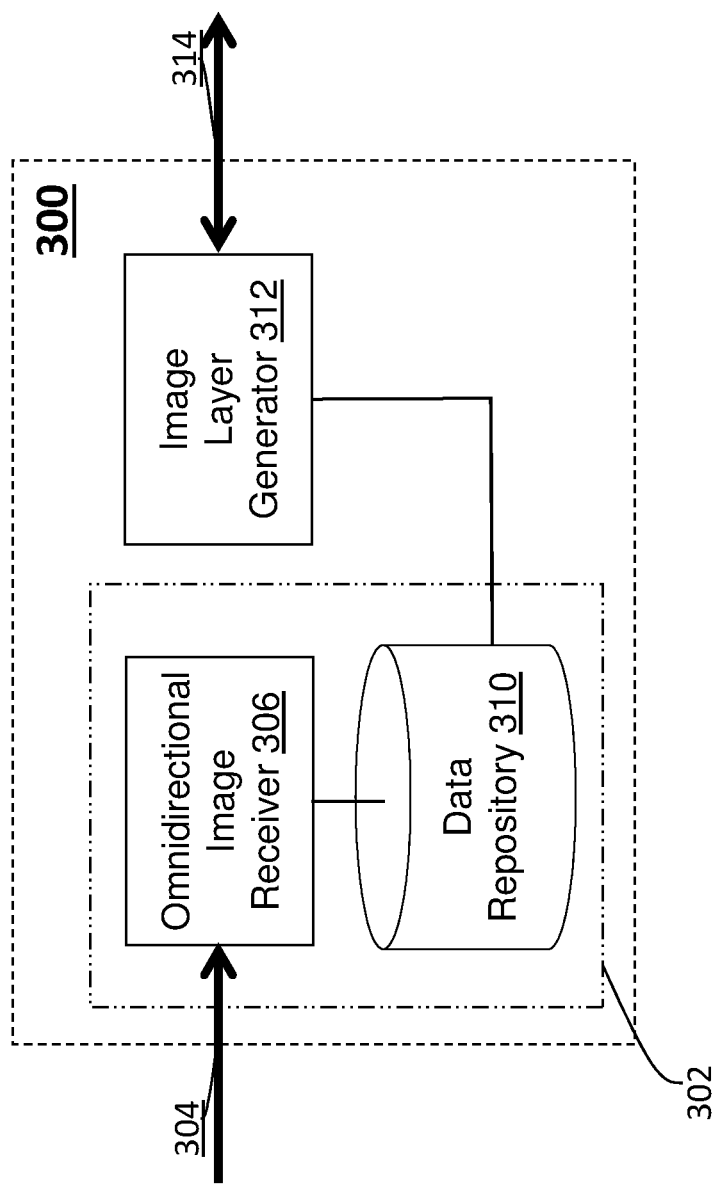
FIG. 3A through FIG. 3C illustrate example video streaming servers and clients.

FIG. 3A illustrates an example video streaming server 300 that comprises an omnidirectional image processor 302, an image layer generator 312, etc. In some embodiments, the omnidirectional image processor (302) comprises an omnidirectional image receiver 306, a data repository 310, etc. Some or all of the components of the video streaming server (300) may be implemented by one or more devices, modules, units, etc., in software, hardware, a combination of software and hardware, etc.

In some embodiments, the omnidirectional image receiver (306) comprises software, hardware, a combination of software and hardware, etc., configured to receive an input omnidirectional image stream 304 from an omnidirectional image source such as a cloud-based omnidirectional image source, a camera system in connection with a VR application, an AR application, a remote presence application, a display application, etc.; decode the input omnidirectional image stream (304) into one or more input omnidirectional images (e.g., a sequence of input omnidirectional images, etc.); etc.

In some embodiments, the data repository (310) represents one or more databases, one or more data storage units/modules/devices, etc., configured to support operations such as storing, updating, retrieving, deleting, etc., with respect to some or all of the input omnidirectional images, etc.

In some embodiments, the image layer generator (308) comprises software, hardware, a combination of software and hardware, etc., configured to receive, via a bidirectional data flow 314, a viewer's view direction data; establish/determine the viewer's view directions (e.g., for each of the two eyes, etc.) over time in relation to a spatial coordinate system in which omnidirectional video content is to be rendered in the viewer's image rendering device (or display device); generate an overall video stream, etc. The overall video stream may comprise one or more video sub-streams for different image layers in pluralities of image layers representing the omnidirectional images. Different image layers in a plurality of image layers representing each of the omnidirectional images may be encoded with different spatial resolutions and/or different frame rates; provide/transmit the overall video stream via the bidirectional data flow 314 directly or indirectly through intermediate devices, etc.) to a video streaming client, a display device, a storage device, etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed by the video streaming server (300).

The video streaming server (300) may be used to support real time omnidirectional video applications, near-real-time omnidirectional video applications, non-real-time omnidirectional video applications, virtual reality, augmented reality, automobile entertainment, helmet mounted display applications, heads up display applications, games, 2D display applications, 3D display applications, multi-view display applications, etc. For example, some or all of omnidirectional images, image layers, view direction tracking data, etc., are generated or accessed by the video streaming server (300) in real time, in near real time, etc.

Figure 3B:
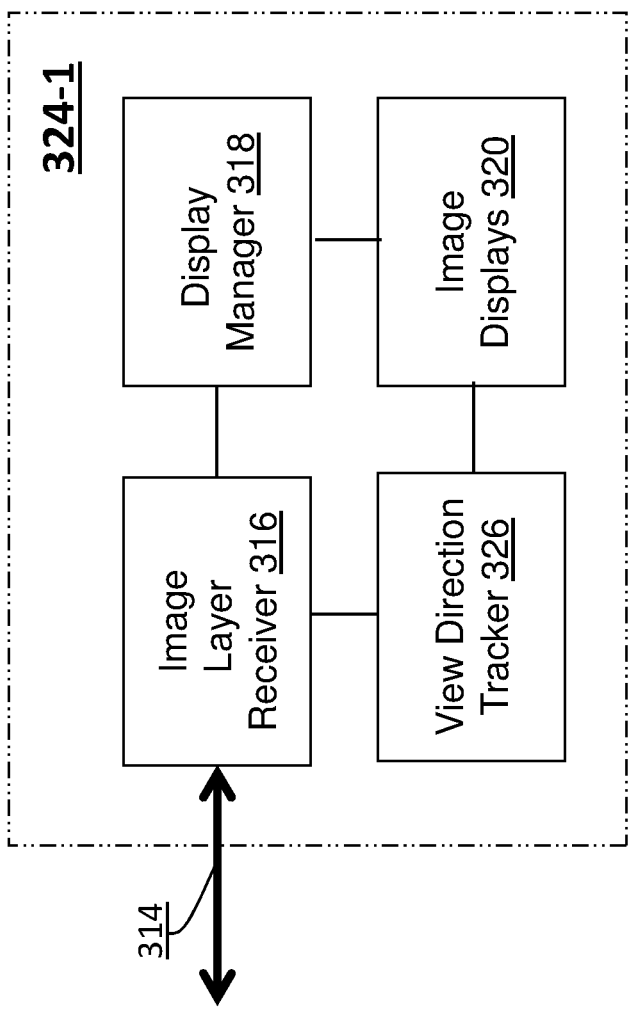

FIG. 3B illustrates an example image rendering system 324-1 that comprises an image layer receiver 316, a view direction tracker 326, a display manager 318, image displays 320, etc. Some or all of the components of the image rendering system (324-1) may be implemented by one or more devices, modules, units, etc., in software, hardware, a combination of software and hardware, etc.

In some embodiments, the image layer receiver (316) comprises software, hardware, a combination of software and hardware, etc., configured to send, via a bidirectional data flow 314, the viewer's view direction tracking data, which can be used by a video streaming server to establish/determine the viewer's view directions over time in relation to a spatial coordinate system in which omnidirectional video content is to be rendered in the viewer's image displays (320); receive an overall video stream comprising different video sub-streams for pluralities of image layers encoded with different spatial resolutions and/or different frame rates; etc.

The user may move the user's view directions at runtime. In some embodiments, the view direction tracker (326) comprises software, hardware, a combination of software and hardware, etc., configured to generate view direction data related to the viewer over time. The view direction tracking data may be sampled or measured at a relatively fine time scale (e.g., every millisecond, every five milliseconds, etc.). The view direction tracking data may be used to establish/determine the viewer's view directions at a given time resolution (e.g., every millisecond, every five milliseconds, etc.).

In some embodiments, the image rendering system (324-1) is configured to generate omnidirectional video content to be rendered on the user's display. In some embodiments, layered representations of omnidirectional images received from one or more video sub-streams in the received video stream may be stitched or composited together to form a unified imagery (or a reconstructed omnidirectional image). De-blocking operations, de-contouring operations, blurring operations, etc., may be performed as a part of compositing the unified imagery to be rendered on the user's display.

In some embodiments, the display manager (318) comprises software, hardware, a combination of software and hardware, etc., configured to perform display management operations on the omnidirectional video content to be rendered on the image displays (320), where the omnidirectional video content is decoded and composited from the video sub-streams in the overall video stream received by the image rendering system (324-1); output display managed omnidirectional video content to the image displays (320) for rendering; etc.

Additionally, optionally, or alternatively, some or all of image rendering operations such as view direction tracking, motion detection, position detection, rotation determination, transformation between coordinate systems, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the image rendering system (324-1).

The image rendering system (324-1) may be used to support real time omnidirectional video applications, near-real-time omnidirectional video applications, non-real-time omnidirectional video applications, virtual reality, augmented reality, automobile entertainment, helmet mounted display applications, heads up display applications, games, 2D display applications, 3D display applications, multi-view display applications, etc. For example, some or all of omnidirectional images, image layers, view direction data, etc., are generated or accessed by the image rendering system (324-1) in real time, in near real time, etc.

Techniques as described herein can be implemented in a variety of system architectures. Some or all image processing operations as described herein can be implemented by one or more of cloud-based video streaming servers, video streaming servers collocated with or incorporated into video streaming clients, image rendering systems, image rendering systems, display devices, etc. Based on one or more factors such as types of omnidirectional video applications, bandwidth/bitrate budgets, computing capabilities, resources, loads, etc., of recipient devices, computing capabilities, resources, loads, etc., of video streaming servers and/or computer networks, etc., some image processing operations can be performed by a video streaming server, while some other image processing operations can be performed by a video streaming client, an image rendering system, a display device, etc.

Figure 3C:
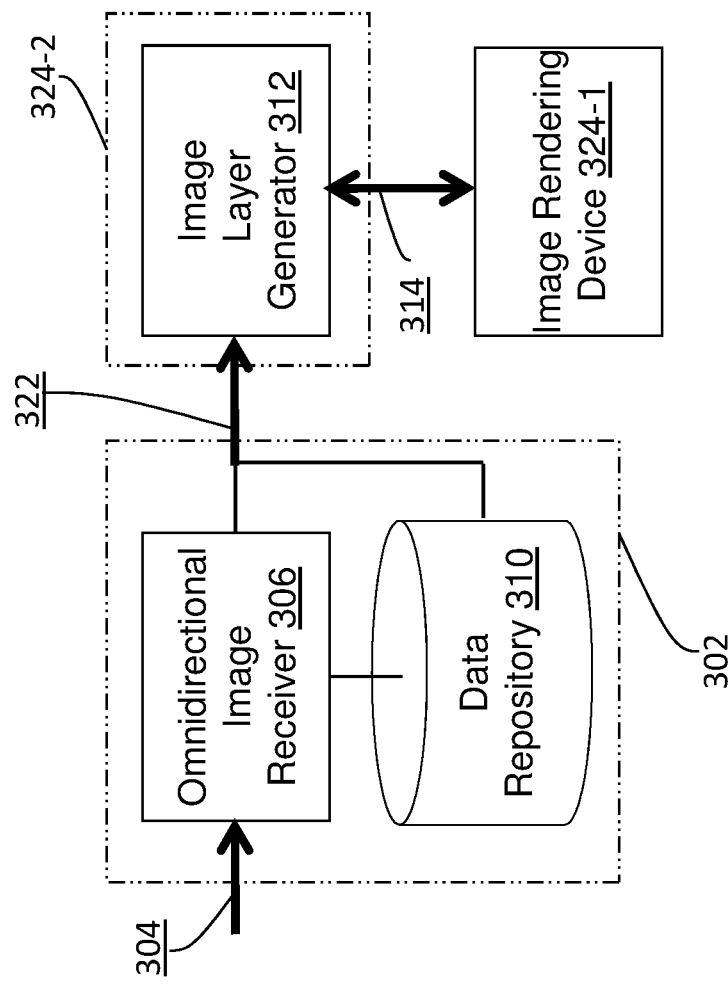

FIG. 3C illustrates an example configuration in which an image layer generator (e.g., 312, etc.) is incorporated into an edge video streaming server 324-2. In some embodiments, an omnidirectional image processor 302 of FIG. 3C may be cloud-based. In some embodiments, the omnidirectional image processor (302) may be located in a core network separate from edge devices such as the edge video streaming server (324-2). As in FIG. 3A, the omnidirectional image processor (302) may comprise an omnidirectional image receiver 306, a data repository 310, etc. The omnidirectional image processor (302) may represent an upstream video streaming server that communicates with the edge video streaming server (324-2) over relatively high bitrates. Some or all of the components of the omnidirectional image processor (302) and/or the edge video streaming server (324-2) may be implemented by one or more devices, modules, units, etc., in software, hardware, a combination of software and hardware, etc.

In some embodiments, the omnidirectional image processor (302) is configured to output omnidirectional images in a data flow 322 to downstream devices one of which may be the edge video streaming server (324-2).

In some embodiments, the edge video streaming server (324-2), or the image layer generator (312) therein, comprises software, hardware, a combination of software and hardware, etc., configured to determine a viewer's view direction over time in relation to a spatial coordinate system in which omnidirectional video content is to be rendered in the viewer's display device; generate an overall video stream comprising different video sub-streams for plurality of image layers encoded with different spatial resolutions and/or different frame rates; provide/transmit the overall video stream via the bidirectional data flow 314 directly or indirectly through intermediate devices, etc.) to a video streaming client, a display device, a storage device, etc.

In some embodiments, an image rendering device (e.g., 324-1), or a display manager (e.g., 318 of FIG. 2B) therein, comprises software, hardware, a combination of software and hardware, etc., configured to perform display management operations on omnidirectional video content to be rendered on the image displays (320), where the omnidirectional video content is decoded and composited from image layers in the video sub-streams in the overall video stream received by the image rendering system (324-1); output display managed omnidirectional video content to the image displays (320) for rendering; etc.

The viewer may move the viewer's view directions at runtime. The image rendering system (324-2) is configured to generate omnidirectional video content to be rendered on the viewer's display device. In some embodiments, image layers from one or more video sub-streams in the received video stream may be stitched or composited together to form a unified imagery (or a reconstructed omnidirectional image). De-blocking operations, de-contouring operations, blurring operations, etc., may be performed as a part of compositing the omnidirectional video content (or the unified imagery) to be rendered on the user's display.

8. Example Process Flows

Figure 4A:
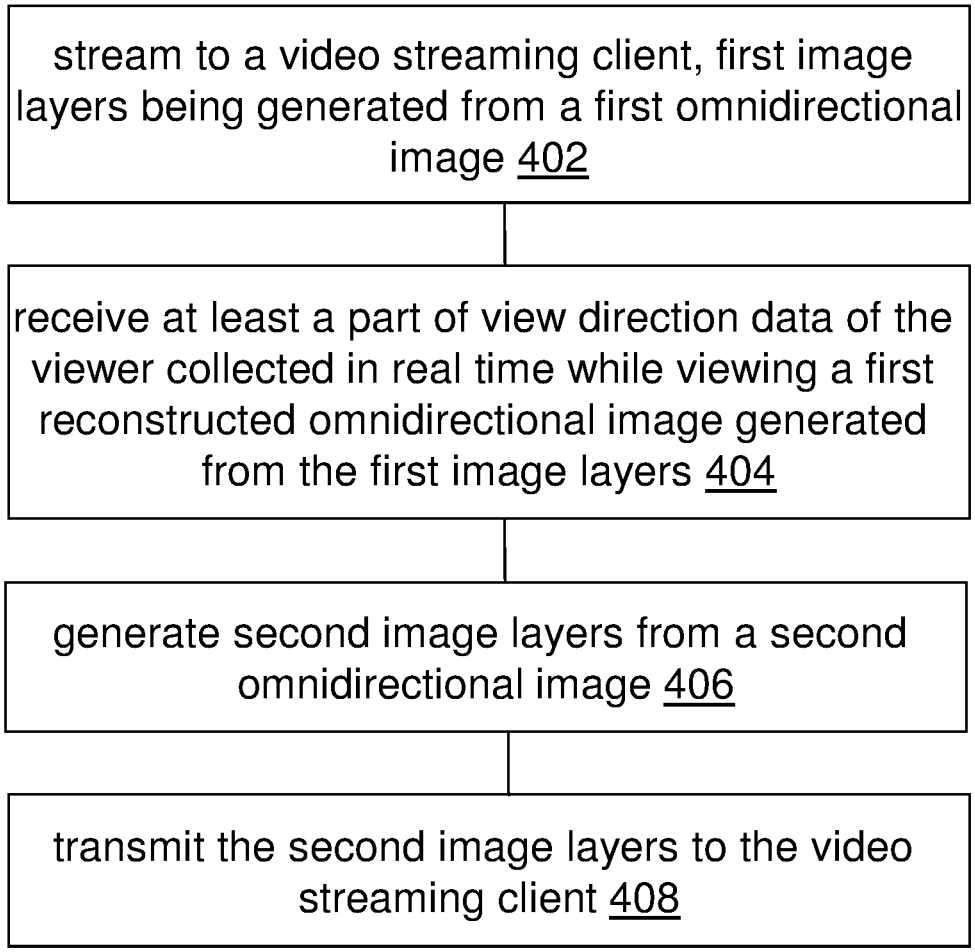
FIG. 4A and FIG. 4B illustrate example process flows.

FIG. 4A illustrates an example process flow according to an example embodiment of the present invention. In some example embodiments, one or more computing devices or components may perform this process flow. In block 402, an omnidirectional image processor (e.g., a video streaming server or a video streaming client of FIG. 3A through FIG. 3C, etc.) streams to a video streaming client, a first plurality of image layers, the first plurality of image layers being generated from a first omnidirectional image in reference to a first view direction of a viewer.

In block 404, the omnidirectional image processor receives at least a part of view direction tracking data of the viewer collected in real time while the viewer is viewing a first reconstructed omnidirectional image generated from the first plurality of image layers, the view direction data indicating a second view direction of the viewer.

In block 406, the omnidirectional image processor generates a second plurality of image layers from a second omnidirectional image in reference to the second view direction of the viewer, the second plurality of image layers comprising (a) a focal-vision image layer that has a focal-vision spatial resolution and covers at least the viewer's foveal vision field region, (b) a peripheral-vision image layer that has a peripheral-vision spatial resolution lower than the focal-vision spatial resolution and covers at least a part of the viewer's peripheral vision field region, etc.

In block 408, the omnidirectional image processor transmits the second plurality of image layers to the video streaming client.

In an embodiment, each image layer in the plurality of image layers represent an image frame.

In an embodiment, the peripheral-vision image layer does not comprise pixel values for pixels located within the viewer's foveal vision field region.

In an embodiment, the second omnidirectional image is immediately subsequent to the first omnidirectional image in a sequence of omnidirectional images in an omnidirectional video application.

In an embodiment, no two image layers in the second plurality of image layers overlap with each other.

In an embodiment, at least two image layers in the second plurality of image layers overlap with each other.

In an embodiment, at least two image layers in the plurality of image layers have one or more of: different spatial shapes, different sizes, or different aspect ratio.

Figure 4B:
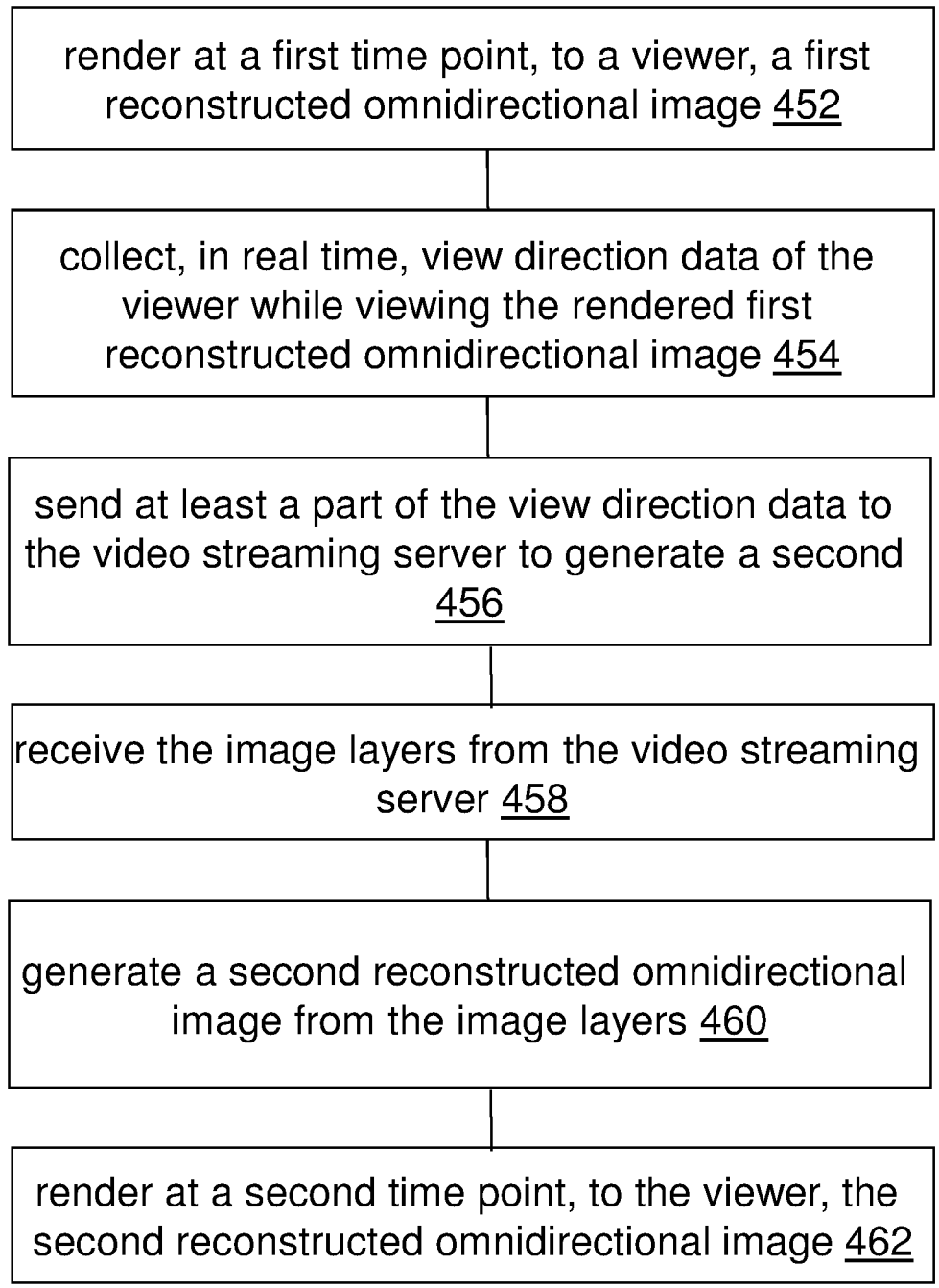

FIG. 4B illustrates an example process flow according to an example embodiment of the present invention. In some example embodiments, one or more computing devices or components may perform this process flow. In block 452, an omnidirectional image processor (e.g., a video streaming client of FIG. 3A through FIG. 3C, etc.) renders at a first time point, to a viewer, a first reconstructed omnidirectional image. The first reconstructed omnidirectional image is generated from a first plurality of image layers received from a video streaming server. The first plurality of image layers is generated by the video streaming server from a first omnidirectional image in reference to a first view direction of the viewer.

In block 454, the omnidirectional image processor collects, in real time, view direction data of the viewer while the viewer is viewing the rendered first reconstructed omnidirectional image, the view direction data being used to determine a second view direction of the viewer.

In block 456, the omnidirectional image processor sends at least a part of the view direction data to the video streaming server to cause the video streaming server to generate a second plurality of image layers from a second omnidirectional image in reference to the second view direction of the viewer, the second plurality of image layers comprising (a) a focal-vision image layer that has a focal-vision spatial resolution and that covers at least the viewer's foveal vision field region, (b) a peripheral-vision image layer that has a peripheral-vision spatial resolution lower than the focal-vision spatial resolution and that covers at least a part of the viewer's peripheral vision field region, etc.

In block 458, the omnidirectional image processor receives the second plurality of image layers from the video streaming server.

In block 460, the omnidirectional image processor generates a second reconstructed omnidirectional image from the second plurality of image layers.

In block 462, the omnidirectional image processor renders at a second time point later than the first time point, to the viewer, the second reconstructed omnidirectional image.

In an embodiment, the peripheral-vision image layer covers the viewer's mid-peripheral vision field region; the second plurality of image layers further comprises a far-peripheral-vision image layer that has a far-peripheral-vision spatial resolution lower than the peripheral-vision spatial resolution and that covers the viewer's far-peripheral vision field region.

In an embodiment, the peripheral-vision image layer covers the viewer's mid-peripheral vision field region and far-peripheral vision field region; the second plurality of image layers further comprises a non-vision-field image layer that has a non-vision-field spatial resolution lower than the peripheral-vision spatial resolution and that covers spatial regions depicted in the second omnidirectional image that are outside the viewer's vision field.

In an embodiment, the focal-vision image layer has a focal-vision frame rate; the peripheral-vision image layer has a peripheral-vision frame rate that is higher than the focal-vision frame rate.

In an embodiment, the focal-vision image layer has a focal-vision dynamic range in luminance; the peripheral-vision image layer has a peripheral-vision dynamic range in luminance that is lower than the focal-vision dynamic range in luminance.

In an embodiment, the focal-vision image layer has a focal-vision color gamut; the peripheral-vision image layer has a peripheral-vision color gamut that is narrower than the focal-vision color gamut.

In an embodiment, the focal-vision image layer is encoded with image data of a first peak-signal-noise-ratio (PSNR); the peripheral-vision image layer is encoded with image data of second PSNR lower than the first PSNR.

In an embodiment, the focal-vision image layer covers up to 30 angular degrees in the viewer's vision field.

In an embodiment, the focal-vision image layer covers the viewer's foveal vision field region and paracentral vision field region.

In an embodiment, the focal-vision image layer comprises a safety region a spatial size of which is dependent on a moving average latency incurred in determining the viewer's view directions by the video streaming server.

In an embodiment, the reconstructed omnidirectional image comprises a set of pixel values that are generated by upsampling image data of the peripheral-vision image layer.

In an embodiment, the reconstructed omnidirectional image comprises a set of pixel values that are directly derived without upsampling from image data of the focal-vision image layer.

In an embodiment, the focal-vision image layer is decoded from a baseline streaming layer and one or more refinement streaming layers in a multi-layer video signal.

In an embodiment, the peripheral-vision image layer is decoded from a baseline streaming layer and zero or more refinement streaming layers in a multi-layer video signal.

In an embodiment, focal-vision image metadata is sent with the focal-vision image layer; peripheral-vision image metadata separate from the focal-vision image metadata is sent with the peripheral-vision image layer.

In an embodiment, the focal-vision image metadata comprises focal-vision display management (DM) metadata for adapting image data in the focal-vision image layer to device-specific focal-vision image data; the peripheral-vision image metadata comprises peripheral-vision DM metadata for adapting image data in the peripheral-vision image layer to device-specific peripheral-vision image data.

In an embodiment, the omnidirectional image processor is further configured to apply one or more of de-blocking operations, de-contouring operations, or blurring operations as a part of rendering the second reconstructed omnidirectional image.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
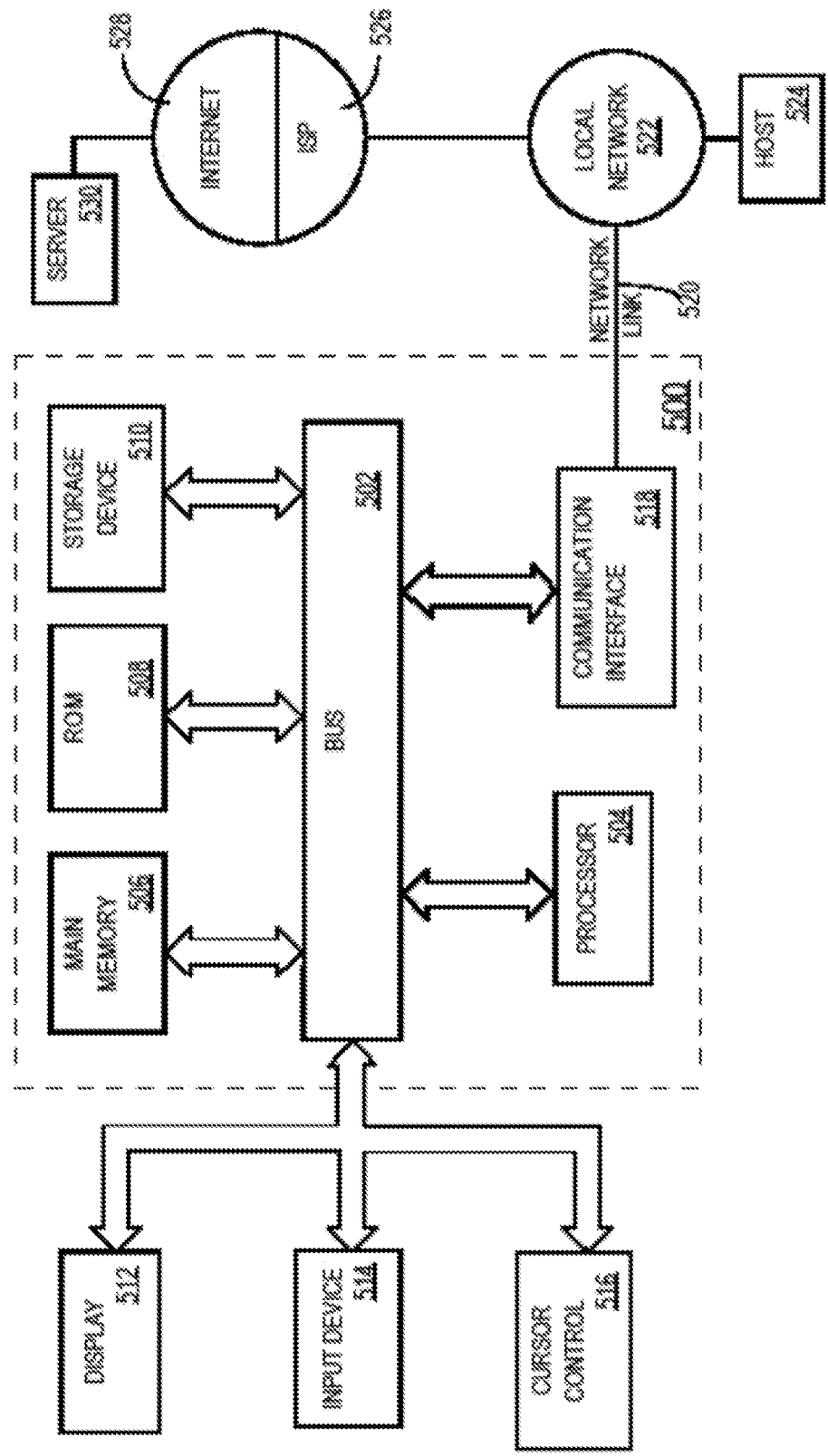
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

10. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for rendering omnidirectional video, comprising:

rendering, by a video streaming client at a first time point, to a viewer, a first reconstructed omnidirectional image, the first reconstructed omnidirectional image being generated from a first plurality of image layers received in a video stream from a video streaming server to the video streaming client, the first plurality of image layers being generated by the video streaming server from a first omnidirectional image in reference to a first view direction of the viewer;

collecting, by the video streaming client through a gaze tracking device in real time, view direction data of the viewer while the viewer is viewing the rendered first reconstructed omnidirectional image, the view direction data being used to determine a second view direction of the viewer, where the second view direction is determined by prediction based at least in part on movements of the viewer;

sending, by the video streaming client, at least a part of the view direction data to the video streaming server to cause the video streaming server to generate a second plurality of image layers from a second omnidirectional image in reference to the second view direction of the viewer, the second plurality of image layers comprising (a) a focal-vision image layer that has a focal-vision spatial resolution and that covers at least the viewer's foveal vision field region, and (b) a peripheral-vision image layer that has a peripheral-vision spatial resolution lower than the focal-vision spatial resolution and that covers at least a part of the viewer's peripheral vision field region, wherein the viewer's foveal vision field region and the viewer's peripheral vision field region are identified by the video streaming server;

receiving, by the video streaming client, the second plurality of image layers in the video stream from the video streaming server to the video streaming client;

generating a second reconstructed omnidirectional image from the second plurality of image layers;

rendering at a second time point later than the first time point, to the viewer, the second reconstructed omnidirectional image.

2. The method of claim 1, wherein the peripheral-vision image layer covers the viewer's mid-peripheral vision field region, and wherein the second plurality of image layers further comprises a far-peripheral-vision image layer that has a far-peripheral-vision spatial resolution lower than the peripheral-vision spatial resolution and that covers the viewer's far-peripheral vision field region.

3. The method of claim 1, wherein the peripheral-vision image layer covers the viewer's mid-peripheral vision field region and far-peripheral vision field region, and wherein the second plurality of image layers further comprises a non-vision-field image layer that has a non-vision-field spatial resolution lower than the peripheral-vision spatial resolution and that covers spatial regions depicted in the second omnidirectional image that are outside the viewers vision field.

4. The method of claim 1, wherein the focal-vision image layer has a focal-vision frame rate, and wherein the peripheral-vision image layer has a peripheral-vision frame rate that is higher than the focal-vision frame rate.

5. The method of claim 1, wherein the focal-vision image layer has a focal-vision dynamic range in luminance, and wherein the peripheral-vision image layer has a peripheral-vision dynamic range in luminance that is different than the focal-vision dynamic range in luminance.

6. The method of claim 1, wherein the focal-vision image layer has a focal-vision color gamut, and wherein the peripheral-vision image layer has a peripheral-vision color gamut that is narrower than the focal-vision color gamut.

7. The method of claim 1, wherein the focal-vision image layer is encoded with image data of a first peak-signal-noise-ratio (PSNR), and wherein the peripheral-vision image layer is encoded with image data of second PSNR lower than the first PSNR.

8. The method of claim 1, further comprising:
determining a third view angle of the viewer at the second time point, wherein the third view angle is different from the second view angle determined based on view angle data collected at the first time point;
predicting a focus-vision region in the viewer's vision field at the second time point in reference to the third view angle;
generating, based at least in part on one or more peripheral-vision image layers in the second plurality of image layers, a focus-vision image portion in reference to the third view angle, wherein the focus-vision image portion corresponds to the predicted focus-vision region.

9. The method of claim 1, wherein the focal-vision image layer covers the viewer's foveal vision field region and paracentral vision field region.

10. The method of claim 1, wherein the focal-vision image layer comprises a safety region a spatial size of which is dependent on a moving average latency incurred in determining the viewers view directions by the video streaming server.

11. The method of claim 1, wherein the reconstructed omnidirectional image comprises a set of pixel values that are generated by upsampling image data of the peripheral-vision image layer.

12. The method of claim 1, wherein the reconstructed omnidirectional image comprises a set of pixel values that are directly derived without upsampling from image data of the focal-vision image layer.

13. The method of claim 1, wherein the focal-vision image layer is decoded from a baseline streaming layer and one or more refinement streaming layers in a multi-layer video signal.

14. The method of claim 1, wherein the peripheral-vision image layer is decoded from a baseline streaming layer and zero or more refinement streaming layers in a multi-layer video signal.

15. The method of claim 1, wherein focal-vision image metadata is sent with the focal-vision image layer, and wherein peripheral-vision image metadata separate from the focal-vision image metadata is sent with the peripheral-vision image layer.

16. The method of claim 15, wherein the focal-vision image metadata comprises focal-vision display management (DM) metadata for adapting image data in the focal-vision image layer to device-specific focal-vision image data, and wherein the peripheral-vision image metadata comprises peripheral-vision DM metadata for adapting image data in the peripheral-vision image layer to device-specific peripheral-vision image data.

17. The method of claim 1, further comprising applying one or more of de-blocking operations, de-contouring operations, or blurring operations as a part of rendering the second reconstructed omnidirectional image.

18. The method of claim 1, wherein the second view direction of the viewer is predicted and is different from an actual prior view direction tracked by one or more view tracking devices.

19. A method for streaming omnidirectional video, comprising:
streaming, by a video streaming server to a video streaming client, a first plurality of image layers in a video stream, the first plurality of image layers being generated from a first omnidirectional image in reference to a first view direction of a viewer;
receiving, by the video streaming server, at least a part of view direction data of the viewer collected through a gaze tracking device in real time while the viewer is viewing a first reconstructed omnidirectional image generated from the first plurality of image layers, the view direction data indicating a second view direction of the viewer, where the second view direction is determined by prediction based at least in part on movements of the viewer;
generating, by the video streaming server, a second plurality of image layers from a second omnidirectional image in reference to the second view direction of the viewer, the second plurality of image layers comprising (a) a focal-vision image layer that has a focal-vision spatial resolution and covers at least the viewer's foveal vision field region, and (b) a peripheral-vision image layer that has a peripheral-vision spatial resolution different from the focal-vision spatial resolution and covers at least a part of the viewer's peripheral vision field region, wherein the viewer's foveal vision field region and the viewer's peripheral vision field region are identified by the video streaming server;
transmitting, by the video streaming server, the second plurality of image layers in the video stream to the video streaming client.

20. The method of claim 19, wherein the peripheral-vision image layer does not comprise pixel values for pixels located within the viewer's foveal vision field region.

* * * * *

UNITED STATES PATENT AND TRADEMARK OFFICE
CERTIFICATE OF CORRECTION

| | | |
|---|---|---|
| PATENT NO. | : 11,290,699 B2 | |
| APPLICATION NO. | : 15/842703 | |
| DATED | : March 29, 2022 | |
| INVENTOR(S) | : Ajit Ninan et al. | |

It is certified that error appears in the above-identified patent and that said Letters Patent is hereby corrected as shown below:

In the Claims

Column 35, Claim 3, Line 17, delete "viewers" and insert --viewer's--.

Column 35, Claim 10, Line 57, delete "viewers" and insert --viewer's--.

Signed and Sealed this
Twenty-second Day of October, 2024

Katherine Kelly Vidal
*Director of the United States Patent and Trademark Office*